US009011589B2

(12) United States Patent
Peng et al.

(10) Patent No.: US 9,011,589 B2
(45) Date of Patent: Apr. 21, 2015

(54) MAGENTA DYES AND THEIR PREPARATION METHODS AND APPLICATIONS

(71) Applicants: Dalian University of Technology, Dalian (CN); Zhuhai Ninestar Management Co., Ltd., Zhuhai (CN)

(72) Inventors: Xiaojun Peng, Dalian (CN); Shiyu Li, Dalian (CN); Jinhe Wu, Dalian (CN); Fanming Meng, Dalian (CN); Rong Zhang, Dalian (CN); Jiangli Fan, Dalian (CN); Feng Wang, Dalian (CN); Shaolei Li, Dalian (CN)

(73) Assignees: Dalian University of Technology, Liaoning (CN); Zhuhai Ninestar Management Co., Ltd., Guangdong (CN)

( * ) Notice: Subject to any disclaimer, the term of this patent is extended or adjusted under 35 U.S.C. 154(b) by 0 days.

(21) Appl. No.: 14/216,906

(22) Filed: Mar. 17, 2014

(65) Prior Publication Data

US 2014/0196630 A1     Jul. 17, 2014

Related U.S. Application Data

(63) Continuation of application No. PCT/CN2012/073710, filed on Apr. 10, 2012.

(30) Foreign Application Priority Data

Mar. 20, 2012  (CN) .......................... 2012 1 0074586

(51) Int. Cl.
*C09D 11/328* (2014.01)
*C09B 5/14* (2006.01)
*C09D 11/02* (2014.01)

(52) U.S. Cl.
CPC . *C09B 5/14* (2013.01); *C09D 11/02* (2013.01); *C09D 11/328* (2013.01)

(58) Field of Classification Search
CPC ................................ C09D 11/328; C09B 5/14
USPC ......................................... 106/31.47; 546/76
See application file for complete search history.

(56) References Cited

U.S. PATENT DOCUMENTS

| | | | | |
|---|---|---|---|---|
| 4,740,581 A | * | 4/1988 | Pruett et al. .................... 546/76 |
| 6,152,969 A | * | 11/2000 | Matsumoto et al. ............ 546/76 |
| 6,471,760 B1 | * | 10/2002 | Matsumoto et al. ....... 106/31.47 |
| 6,685,768 B2 | * | 2/2004 | Blease et al. .............. 106/31.47 |
| 6,843,839 B2 | * | 1/2005 | Kanke et al. .............. 106/31.47 |
| 7,476,270 B2 | * | 1/2009 | McGorrin .................. 106/31.47 |
| 7,618,484 B2 | * | 11/2009 | Fujimoto et al. .......... 106/31.47 |
| 7,691,191 B2 | * | 4/2010 | Matsumoto et al. ....... 106/31.47 |
| 7,785,411 B2 | * | 8/2010 | Ishii et al. ................. 106/31.47 |
| 7,828,886 B2 | * | 11/2010 | Baettig et al. ............. 106/31.47 |
| 7,985,287 B2 | * | 7/2011 | Murakami et al. ........ 106/31.47 |
| 8,734,580 B2 | * | 5/2014 | Peng et al. ................. 106/31.47 |
| 2008/0257209 A1 | | 10/2008 | Kitamura et al. .......... 106/31.48 |
| 2010/0075112 A1 | | 3/2010 | Ishii et al. .................. 428/195.1 |
| 2013/0327248 A1 | * | 12/2013 | Peng et al. ...................... 546/76 |

FOREIGN PATENT DOCUMENTS

| | | |
|---|---|---|
| CN | 1295600 A | 5/2001 |
| CN | 1400257 A | 3/2003 |
| CN | 101298526 A | 11/2008 |
| CN | 101595185 A | 12/2009 |
| CN | 101684201 A | 3/2010 |
| JP | 2000-256587 A | 9/2000 |
| JP | 2012-41315 A | 3/2012 |
| WO | WO 2010/084740 A1 | 7/2010 |

OTHER PUBLICATIONS

International Search Report of corresponding International Application No. PCT/CN2012/073710, dated Dec. 27, 2012.
The extended European Search Report and Search Opinion of correspondence European Application No. 12871822.8 and correspondence International PCT Application No. PCT/CN2012/073710, dated Dec. 23, 2014.

* cited by examiner

*Primary Examiner* — Helene Klemanski
(74) *Attorney, Agent, or Firm* — J.C. Patents

(57) ABSTRACT

The present invention relates to a class of magenta dyes, their preparation methods and applications. The magenta dyes include the compounds which simultaneously contain carboxyl group, sulfonic acid group and the carbonyl propyl sulfurylsulfonic acid on the anthrapyridone skeleton, showing in the form of general formula (I) or their mixtures. In the general formula (I): A may be cation $M_4$, or substituted or unsubstituted benzyl group, or substituted or unsubstituted naphthyl methyl; $M_1$, $M_2$, $M_3$ are respectively cation or cationic groups; Sulfonic acid group $(SO_3M_2)_m$ may located any position of the benzene ring, of which m is an integer of 0-2. As containing carboxyl (or carboxylic benzyl ester or naphthoate), sulfonic acid groups and carbonyl propyl sulfuryl simultaneously, the magenta dyes of the present invention feature outstanding tone, brightness, light resistance, water resistance, ozone resistance as well as solubility and solution stability, etc.

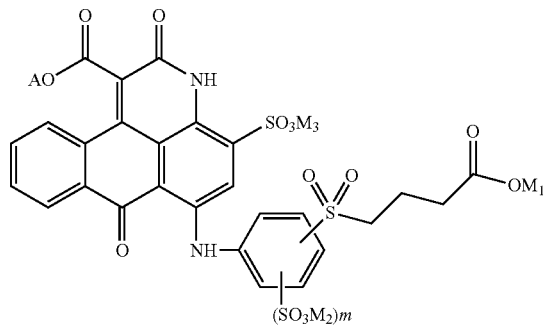

20 Claims, No Drawings

MAGENTA DYES AND THEIR PREPARATION METHODS AND APPLICATIONS

CROSS-REFERENCE TO RELATED APPLICATIONS

This application is a continuation of International Application No. PCT/CN2012/073710, filed on Apr. 10, 2012, which claims the priority benefit of China Patent Application No. 201210074586.7, filed on Mar. 20, 2012. The contents of the above identified applications are incorporated herein by reference in their entireties.

FIELD OF THE TECHNOLOGY

The present invention relates to a class of magenta dyes, their preparation methods and applications. It especially relates to the compounds on the anthrapyridone ring with sulfonic acid group and carboxyl group simultaneously, or salts thereof or ester thereof or their mixtures, as well as the applications as magenta colorant.

BACKGROUND

Among color recording methods, ink-jet printing is one of the typical ones. As the nozzles do not contact the recording materials, so ink jet printers are characterized by quietness as well as ease in realizing miniaturization, high-speed and colorization. Therefore, ink jet printing has been developed rapidly in recent years.

Different from traditional pen inks, inkjet inks requires to be capable of forming high-density images, not blocking nozzles, drying well, bleeding little, being stored stably and so on. In addition, images formed by ink-jet inks require having water resistance, moisture resistance, light resistance, ozone resistance, and higher requirements are raised for these fastness. Water resistance: Usually the substrate surface may adsorb porous silicon oxide, cationic polymers, alumina sol or special ceramics, and thus if dyes are applied on paper surface together with such organic or inorganic particles as well as PVA resin, water resistance can be significantly improved. Light resistance: In the four primary colors, namely yellow, magenta, cyan and black, magenta has the weakest light resistance and can seriously affect image quality; therefore, it has become an important subject to improve light resistance of magenta dyes. Moisture resistance: if printed images are to be saved in a high-humidity environment, it is required that dyes, as part of recording materials, are of good anti-bleeding fastness. If bleeding of dyes occurs, image quality will be significantly reduced, especially on occasions that high requirements are imposed on color matching for photos. However, compared with water resistance, improvement of light resistance, moisture resistance, ozone resistance and solubility are more difficult to be realized.

In addition, with the wide popularity of digital cameras in recent years, the opportunity to print photos at home is increasing. When the printed products are stored, oxidizing gases in indoor air which causes discoloration of images has also become one of the problems. Oxidizing gases cause discoloration and fading of images by reaction with the dyes on or in the recording paper. Particularly, ozone gas is a principal substance of promoting oxidization and fading of inkjet print images, so the improvement of ozone gas resistance has become a subject equally important as the improvement of light resistance.

Typical examples of magenta dyes for inkjet inks include: xanthene type rhodamine dyes and azo dyes derived from H-acid coupling. While rhodamine dyes are most prominent in tone and brightness, they are extremely poor in light resistance. H-acid derived azo dyes are of good lustre and water resistance and meanwhile are of poor light resistance, ozone resistance and brightness; Particularly compared with cyan dyes with copper phthalocyanine and yellow azo dyes, it is still of poor light resistance.

In recent years, magenta dyes of outstanding light resistance and brightness have been developed, including anthrapyridone dyes. They have no methyl formate group and sulfonic acid group on the anthracene ring of their molecular scaffolds, but having favorable performance. Examples of related patent: CN101595185A, CN101298526A, US2008257209A$_1$, U.S. Pat. No. 7,691,191B$_2$ and the like.

However, dyes revealed in these patents do not meet all requirements of tone, brightness, light resistance, water resistance, ozone resistance as well as solubility and solution stability. Although light resistance and ozone resistance of some dyes have been improved, the solubility of the dyes and the stability of inkjet inks are still insufficient, especially the long-term stability. Long-term stability of dyes in inks is associated with their solubility; Especially the solubility of dyes in water is not ideal on many occasions.

SUMMARY

The purpose of the present invention is to provide a class of magenta dyes with improved tone, brightness, light resistance, water resistance, ozone resistance as well as solubility and solution stability compared with the traditional magenta dyes.

To solve the mentioned problems, the present invention provided a class of magenta dyes, which simultaneously contain carboxyl group, sulfonic acid group and the carbonyl propyl sulfurylsulfonic acid on the anthrapyridone skeleton, showing in the form of general formula (I) or their mixtures.

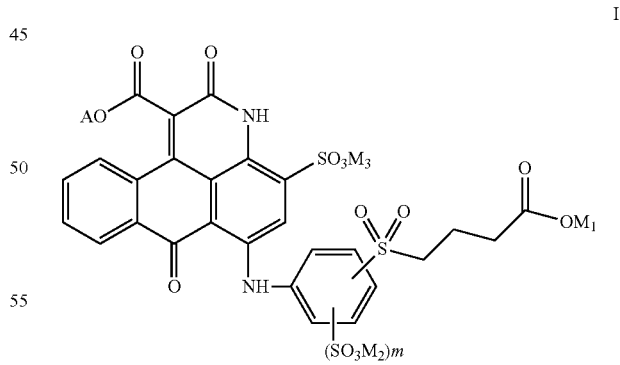

In the general formula (I): A may be cation $M_4$, or substituted or unsubstituted benzyl group, or substituted or unsubstitutednaphthyl methyl; $M_1$, $M_2$, $M_3$ are respectively cation or cationic groups; sulfonic acid group $(SO_3M_2)_m$ may be located any position of the benzene ring, of which m is an integer of 0-2.

When A is cation $M_4$, the general formula (I) is changed to the general formula (I'):

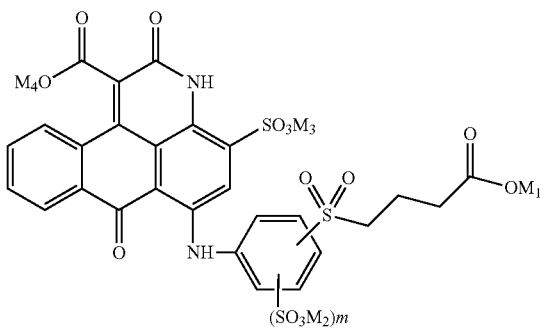

When A is substituted or unsubstituted benzyl group, the general formula (I) is changed to the general formula (II):

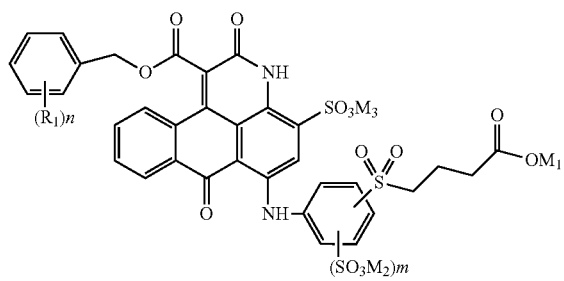

When A is substituted or unsubstituted naphthyl methyl, the general formula (I) is changed to the general formula (II'):

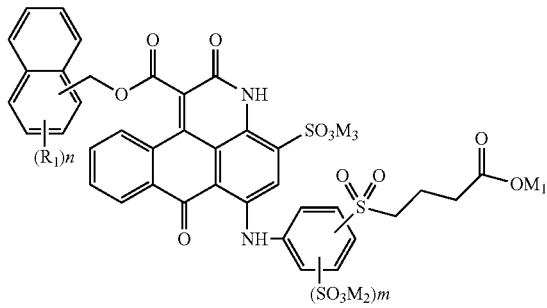

In the general formula (II) and (II'), $R_1$ is H, $C_{1-6}$alkyl group, CN, $NO_2$, $SO_3H$ or $SO_3M_5$, F, Cl, Br, $CO_2H$, $CO_2M_6$, $CO_2R_2$, or $NHCOR_3$; $R_2$ is H or $C_{1-6}$alkyl group; $R_3$ is H or $C_{1-6}$alkyl group; $(R_1)n$ may be located any position of the benzene ring, of which n is an integer of 0-3;

In the general formula (I'), (II) and (II'), $M_1$, $M_2$, $M_3$, $M_4$, $M_5$, $M_6$ are respectively cation or cationic groups; sulfonic acid group $(SO_3M_2)_m$ may be located any position of the benzene ring, of which m is an integer of 0-2.

In the present invention $M_1$, $M_2$, $M_3$, $M_4$, $M_5$, $M_6$ are preferably selected from the following cation: $H^+$, $Li^+$, $Na^+$, $K^+$, $NH_4^+$, or organic ammonium salts $N^+R_4R_5R_6R_7$, of which $R_4$, $R_5$, $R_6$, $R_7$ are respectively the same or different H, $C_{1-18}$alkyl group, cyclohexyl group, $CH_2CH_2OH$, $CH(CH_3)CH_2OH$ or benzyl group.

Said m is preferably an integer of 1-2.

In a preferred embodiment, said organic ammonium salt $N^+R_4R_5R_6R_7$ is selected from: monoethanolamine salt, diethanolamine salt, triethanolamine salt, monoisopropanolamine salt, diisopropanolamine salt or triisopropanolamine salt.

In a more preferred embodiment, said cation is selected from $H^+$, $Li^+$, $Na^+$, $K^+$, or $NH^+$.

In the practical application, the compound shown in the general formula (I) may be used in the form of mixture with any ration.

The method for preparing the compound of general formula (I) comprise the following steps:

(1) Synthesizing an intermediate compound shown in the general formula (IV):

In the general formula (IV), $R_8$ is $C_1$-$C_4$ alkyl group;

The cyclization steps comprise: based on a compound shown in the general formula (III) or (III') as a raw material, carrying out cyclization reaction on the compound shown in the general formula (III) or (III') and malonic acid diester ($R_8OOC$—$C$—$COOR_8$) in an organic solvent at the temperature of 100° C.-250° C. for 2-10 h to form the intermediate compound shown in the general formula (IV).

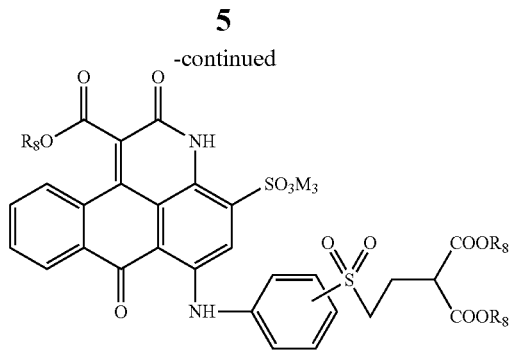
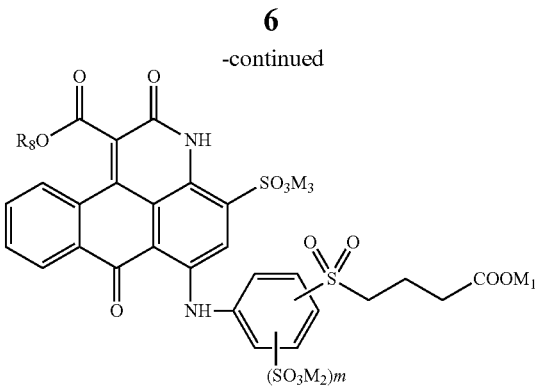

Cool the reaction system after the cyclization and filter the compound of general formula (IV) separated out from the liquid reaction system to obtain the solid intermediate (IV) compounds.

Said reaction temperature is preferably 100° C.-200° C., and more preferably 130° C.-190° C.; Said reaction time is preferably 2-12 h, more preferably 2-10 h, and still more preferably 2-8 h; Said organic solvent has the boiling point of 100° C.-300° C. and can dissolve or partially dissolve the reaction raw material (III) or (III'), and the boiling point is preferably 140° C.-250° C., and more preferably 140° C.-200° C.

(2) Sulfonation and decomposition step: the intermediate compound shown in the general formula (IV) is sulfonated with fuming sulfuric acid ($SO_3 \cdot H_2SO_4$) containing 5-30%$SO_3$ or chlorosulfonic acid under the temperature of 10° C.-120° C., and simultaneously decomposition reaction is carried out for 2-4 h, preferably 3-4 h to obtain a mixture. Said the mixture comprises one or more the compounds shown in the general formula (V), (VI), (VII). The sulfonation temperature is preferably 10° C.-100° C., and the content of sulfur trioxide in fuming sulfuric acid is preferably 5-20%, and more preferably 6-15%. The number m of sulfonic group in the aforementioned compounds is relation to the content of sulfur trioxide in fuming sulfuric acid and the sulfonation temperature. When at the low content and low temperature, obtaining the compound with m is 1. When at the higher content and temperature, obtaining the compound with m is 2.

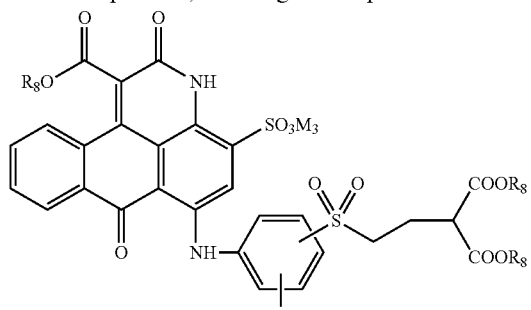
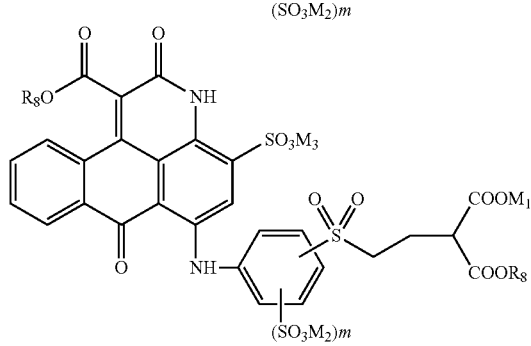

(3) Hydrolysis step: the sulfonation liquid obtained in the step (2) are hydrolyzed at the acid condition or the alkaline condition.

Hydrolysis at acid condition: heated the sulfonation liquid obtained in the step (2) to 40° C.-80° C., and hydrolysis 1.5-5 h. Then neutralized the sulfuric acid in the sulfonation liquid using alkali, finally obtained solution of the compound shown in the general formula (I') ($M_4$ is H).

Hydrolysis at alkaline condition: neutralized the sulfonation liquid obtained in the step (2) using alkali to neutral, then adjusted pH using alkali (for example $M_4OH$) to 9-10 emerging alkalescence, then heated to 40° C.-80° C., hydrolyzed 1.5-5 h, finally obtained solution of the compound shown in the general formula (I').

The hydrolysis temperature is preferably 40° C.-80° C., more preferably 40° C.-70° C., more preferably 50° C.-70° C., and more preferably 60° C.-70° C.

The hydrolysis time is preferably 1.5-5 h, more preferably 1.5-4 h, more preferably 1.5-3 h, and more preferably 1.5-2 h.

The alkali using in the hydrolysis reaction include but not limited to the following: sodium hydroxide, calcium hydroxide, potassium hydroxide, ferric hydroxide, copper hydroxide etc. It is preferably sodium hydroxide, calcium hydroxide, potassium hydroxide, ferric hydroxide, and more preferably sodium hydroxide, potassium hydroxide, calcium hydroxide, and more preferably sodium hydroxide, calcium hydroxide, more preferably calcium hydroxide.

(4) Benzylation (or Naphthyl methylation) step: the compound shown in the general formula (II) is obtained by benzylation (or naphthyl methylation) reaction using benzylation (or naphthyl methylation) reagent and solution of the compound shown in the general formula (I') in the step (3) under the condition of definite temperature, pH, rate of charge, reaction time.

The temperature of benzylation reaction is preferably 50° C.-150° C., more preferably 60° C.-130° C., more preferably 70° C.-80° C.; The pH of benzylation reaction is preferably 0-12, more preferably 3-12, more preferably 5-10, more preferably 6-10, more preferably 7-9; The mole rate of charge of benzylation reaction (I': benzylation reagent) is preferably 1:1-100, more preferably 1:1-80, more preferably 1:1-70, more preferably 1:1-60, more preferably 1:1-50, more preferably 1:1-40; The reaction time of benzylation reaction is preferably 1-120 h, more preferably 1-96 h, more preferably 1-72 h, more preferably 1-48 h, more preferably 1-24 h.

The temperature of naphthyl methylation reaction is preferably 70° C.-150° C., more preferably 70° C.-130° C., more preferably 70° C.-120° C., more preferably 50° C.-110° C., more preferably 50° C.-100° C.; The pH of naphthyl methylation reaction is preferably 0-12, more preferably 3-12, more preferably 4-9, more preferably 5-7; The mole rate of charge of naphthyl methylation reaction (I': naphthyl methylation reagent) is preferably 1:1-20, more preferably 1:1-10, more preferably 1:1-5, more preferably 1:1-3; The reaction time of naphthyl methylation reaction is preferably 0.5-10 h, more preferably 1-5 h, more preferably 1-3 h.

(5) Salting-out step: the mixture obtained in the step (4) is salted out with a salt to generate a salt mixture, wherein the salt mixture comprises one or more salts of the compounds shown in the general formula (I).

The salt used in the salting-out step is preferably an inorganic salt, and the inorganic salt is preferably selected from ammonium chloride, sodium chloride or lithium chloride.

(6) Separation step: the salts of the compounds shown in the general formula (I) are separated out from the salt mixture by adopting stepwise salting out, reversed phase ion-pair chromatography etc., and the obtained salts of the compounds are respectively desalinated to generate the compounds shown in the general formula (I).

The third aspect of the present invention relates to the application of the compound shown in the general formula (I) or their mixture in the ink-jet printing: the compound shown in the general formula (I) or their mixture applying in the ink, including printing ink, painting ink or inkjet ink; Said ink include water-based, solvent-based or aqueous solvent-based inkjet ink. Said water-based inkjet ink consisting of 1-20% of the compound shown in the general formula (I), or their mixture by weight, 5-50% of organic solvents miscible with water by weight, and 30-94% of water by weight based on the total weight of the composition, wherein the sum of the component contents is 100%. Said water-miscible organic solvents are preferably selected from one or more of the followings: ethanol, propanol, isopropanol, ethylene glycol, diethylene glycol, triethylene glycol, glycerol, ethylene glycol monobutyl ether, diethylene glycol monobutyl ether, triethylene glycol monobutyl ether, propylene glycol, butanediol, pentanediol, hexanediol, diglycerol, 2-pyrrolidone and N-methyl-2-pyrrolidone.

The compounds shown in the general formula (I) provided by the invention have such structural characteristics: simultaneously contain carboxyl (or carboxyl benzyl ester or naphthyl methyl ester) groups, sulfonic acid group, Carbonyl propyl sulfuryl. Said compounds have the following beneficial effects:

1. The introduction of carboxyl or benzyl (or naphthyl methyl) ester, sulfonic acid group, carbonyl propyl sulfuryl reduce the electron cloud density of parent dye molecules and further improve the light resistance and ozone resistance;

2. Carboxyl (or carboxyl benzyl ester or naphthyl methyl ester), carbonyl propyl sulfuryl, sulfonic acid group are introduced to the sulfonic acid compounds of substituted anthrapyridone to increases the water-solubility of dyes;

3. The introduction of carboxyl benzyl (or naphthyl methyl) ester, carbonyl propyl sulfuryl enhance the flexibility of the dye molecule, which make the dye not easy to crystallize. The affinity with an organic humectant such as ethylene glycol and glycerol additive in the ink is increased, and the ink stability is favorably improved.

4. In the preparation methods described in the present invention, commercially available blue dye derivatives are used as basic raw materials for synthesis, which is thus characterized by convenience in operation and low costs. The currently available patent techniques take non-dye compounds as the starting materials, which require higher costs and more reaction steps.

The compounds and the mixture thereof in the present invention are applicable to be used as a colorant in multiple materials, such as ink, coating, paint, laser printing toner, marker, paper, fabric, glass, ceramic, or polymeric material etc.

Dye compounds and their mixture of the present invention are prominent in water solubility and long-term stability, which are particularly suitable for the lustre and brightness requirements for inkjet printing. The fastness of light resistance, moisture resistance and ozone resistance of images printed with inkjet inks prepared by the involved dye compounds is outstanding, and high brightness tone can be achieved on inkjet recording materials.

DETAILED DESCRIPTION

The mixture provided by the present invention refers to: mixture of the compounds shown in the general formula (I). In the said mixtures, the compounds or the salts thereof can be mixed at a random ratio.

In practical application, the salt form of the carboxyl and carbonyl propyl sulfurylanthrapyridone sulfonic acid compounds shown in the general formula (I) is generally used. The invention relates to the compounds, salts thereof or their mixtures, preferably the mixture form of the salts of the compounds.

The applications of these compounds, salts thereof or their mixtures are characterized by brightness and extremely high tones on inkjet recording paper, outstanding water solubility and good filterability on the filter membrane. In addition, ink compositions containing the dye compound or the mixture are subject to no crystal precipitation, physical changes and color changes in long-term preservation and thus features good storage stability and can present photo-tone color images truthfully in long term; Even images printed on the surface of special paper of photo quality (film) are of good fastness of light resistance, ozone resistance and moisture resistance and thus long-term storage stability.

The compound shown in the general formula (I) is carbonyl anthrapyridone sulfonic acid compound, wherein carbonyl propyl sulfuryl, sulfonic acid group and carboxyl (or carboxyl benzyl ester) groups are introduced to the substituted anthrapyridone sulfonic acid compound molecule:

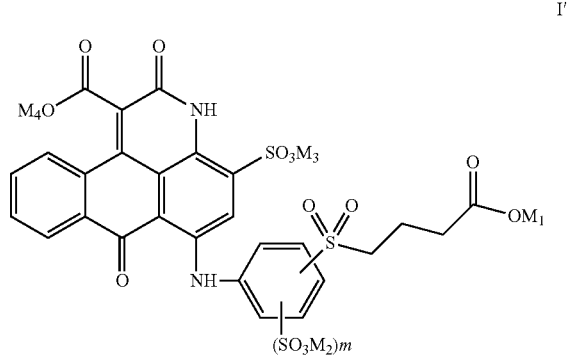

-continued

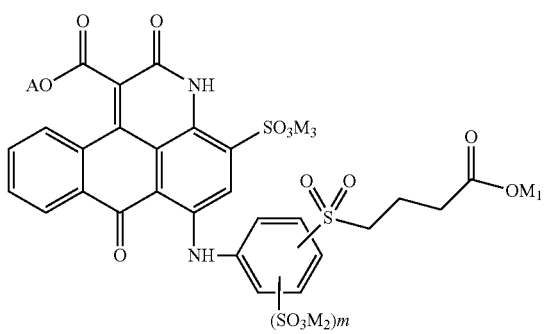

In the general formula (I): A may be cation $M_4$, or substituted or unsubstituted benzyl group, or substituted or unsubstituted naphthyl methyl. When A is cation $M_4$, the general formula (I) is changed to the general formula (I'); When A is substituted or unsubstituted benzyl group, the general formula (I) is changed to the general formula (II); When A is substituted or unsubstituted naphthyl methyl, the general formula (I) is changed to the general formula (II'):

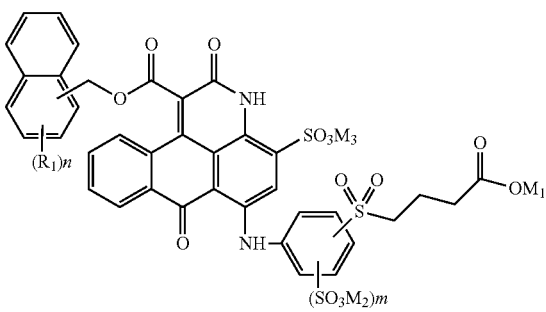

In the general formula (II) and (II'), $R_1$ is H, $C_{1-6}$ alkyl group, CN, $NO_2$, $SO_3H$ or $SO_3M_5$, F, Cl, Br, $CO_2H$, $CO_2M_6$, $CO_2R_2$, or $NHCOR_3$; $R_2$ is H or $C_{1-6}$ alkyl group; $R_3$ is H or $C_{1-6}$ alkyl group; $(R_1)n$ may locate any position of the benzene ring, of which n is an integer of 0-3.

In the general formula (I), (I'), (II) and (II'), $M_1$, $M_2$, $M_3$, $M_4$, $M_5$, $M_6$ are respectively cation or cationic groups.

In the general formula (I), (I'), (II) and (II'), sulfonic acid group $(SO_3M_2)_m$ may locate any position of the benzene ring, of which m is an integer of 0-2, preferably an integer of 1-2.

In the present invention $M_1$, $M_2$, $M_3$, $M_4$, $M_5$, $M_6$ are preferably selected from the following cation: $H^+$, $Li^+$, $Na^+$, $K^+$, $NH_4^+$, or organic ammonium salts $N^+R_4R_5R_6R_7$, of which $R_4$, $R_5$, $R_6$, $R_7$ are respectively the same or different H, $C_{1-18}$ alkyl group, cyclohexyl group, $CH_2CH_2OH$, $CH(CH_3)CH_2OH$ or benzyl group.

In a preferred embodiment, said organic ammonium salt $N^+R_4R_5R_6R_7$ is selected from: monoethanolamine salt, diethanolamine salt, triethanolamine salt, monoisopropanolamine salt, diisopropanolamine salt or triisopropanolamine salt.

In a more preferred embodiment, said cation is selected from $Li^+$, $Na^+$, $K^+$ or $NH^{4+}$.

In practical application, the compound shown in the general formula (I) can be used in a mixture form of random ratio.

Preparation of the compound shown in the general formula (I) and their mixture:

In preparation of the compound of the present invention, other than the method for preparing other anthrapyridone sulfonic acid compounds by using a non-dye compound as the starting raw material in the prior art, low-cost anthraquinone dye derivatives shown in the general formula (III) or (III') with a sulfonic acid group are used as base raw material. Cyclization reaction is carried out by using said base raw material and malonic acid diester ($R_8OOC$—C—$COOR_8$) in an organic solvent to form the intermediate compound shown in the general formula (IV), then sulfonation and hydrolysis as well as benzylation reactions are carried out to form the compound shown in the general formula (I), salting-out or salt conversion are carried out to form the salt mixture, and then separation and desalination are carried out to obtain the pure compound shown in the general formula (I).

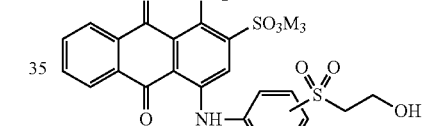

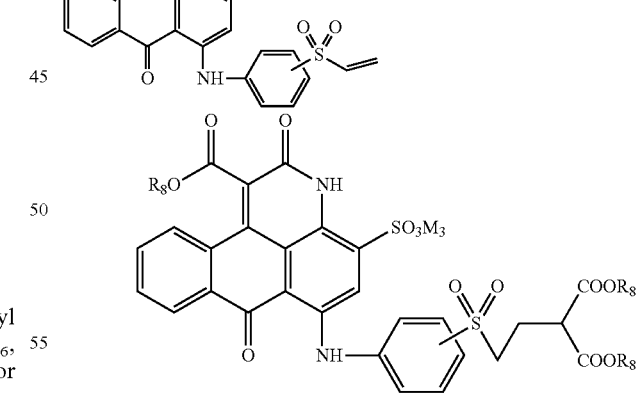

In the malonic acid diester and the compound shown in the general formula (IV), $R_8$ is selected from $C_1$-$C_4$ alkyl group, and preferably methyl group and ethyl group.

The compound shown in the general formula (IV) is synthesized by reacting the compound shown in the general formula (III) or (III') with malonic acid diesterin an organic solvent with the boiling point of 100° C.-300° C. at the temperature of 100° C.-250° C. for 2-10 h to form the compound shown in the general formula (IV).

Malonic acid diester is selected from dimethyl malonate, diethyl malonate, dipropylmalonate or dibutylmalonate.

The mentioned organic solvent has the boiling point of 100° C.-300° C. and can dissolve or partially dissolve the reaction raw material (III) or (III').

In reaction processing, the byproducts water and alcohol $R_8OH$ are discharged from the reaction system under the condition of heating reflux or heating evaporation so as to accelerate the reaction. Water segregator is used to remove the resulting byproducts water and alcohol from the reflux condenser to promote the reaction.

The end of cyclization reaction can be determined by conventional methods of the industry, e.g., liquid chromatography or thin layer chromatography. Disappearance of characteristic blue peak of the raw material (III) or (III') in the liquid chromatogram indicates the end of the reaction.

No special restrictions are placed on the molar ratio of the compound (III) or (III') and malonic acid diester in cyclization reaction. A proper ratio can be selected by the common technical personnel according to the prior art and common sense. The molar ratio is preferably 1:2-100, preferably 1:2-50, more preferably 1:2-25, still more preferably 1:2-15, still more preferably 1:2-10 and 1:2-5.

Malonic acid diester, as one of the raw materials for the reaction, can also be directly used as the reaction solvent. In this case, the consumption of malonic acid diester will be greater. The raw material can be selected from dimethyl malonate, diethyl malonate, dipropylmalonate or dibutylmalonate to form corresponding compound shown in the general formula (IV).

Organic solvents used in the cyclization reaction should be capable of dissolving or partly dissolving the raw material (III) or (III') to accelerate the reaction. The byproducts water and alcohol can be discharged from the reaction system by evaporation.

The boiling point of the involved organic solvents is 100° C.-300° C., preferably 140° C.-250° C. and more preferably 140° C.-200° C.

Said organic solvents include but not limited to: toluene, all isomers of dimethylbenzene and its isomer mixture, all isomers of trimethylbenzene and its isomer mixture, all isomers of diethylbenzene and its isomer mixture, all isomers of triethylbenzene and its isomer mixture, petroleum ether, ethylene glycol dimethyl ether, ethylene glycol diethyl ether, ethylene glycol dipropyl ether, ethylene glycol dibutyl ether, 1,2-propylene glycol dimethyl ether, 1,2-propylene glycol diethyl ether, 1,2-propylene glycol dipropyl ether, 1,2-propylene glycol dibutyl ether, diethylene glycol dimethyl ether, diethylene glycol diethyl ether, diethylene glycol dipropyl ether, diethylene glycol dibutyl ether, chlorobenzene, all isomers of dichlorobenzene, mixed dichlorobenzene, dimethyl sulfoxide (DMSO), dimethyl formamide (DMF), N-methyl pyrrolidone (NMP), sulfolane, and mixture of the above solvents.

Said organic solvents are more preferably selected from: dimethylbenzene, diethylbenzene, trimethylbenzene, chlorobenzene, dichlorobenzene, trichlorobenzene, nitrobenzene, DMSO, DMF, 2-pyrrolidone, NMP, sulfolane and their mixture.

Said organic solvents are most preferably selected from: dimethylbenzene isomer mixture, o-dichlorohenzene, mixed solvent of dimethylbenzene and DMSO, mixed solvent of o-dichlorohenzene and DMSO.

Temperature for the cyclization reaction is 100° C.-250° C., preferably 100° C.-200° C. and more preferably 130° C.-190° C.

The reaction temperature may be increased or regulated under boosting pressure or vacuum conditions, which can adopt atmospheric pressure of 0.5-5 atm.

The cyclization reaction time is preferably 2-12 h, more preferably 2-10 h, and still more preferably 2-8 h.

Cool the reaction system to 0-50° C. (preferably 0-30° C.) after the cyclization to separate out the solid-state intermediate compound of general formula (IV) from the liquid reaction system to obtain the solid intermediate (IV).

During or after the reaction system cools down, add low-boiling point organic solvents to promote full precipitation of the intermediate (IV). Preferably low-boiling point organic solvents with boiling point of 30° C.-150° C. have low solubility to the intermediate (IV).

Said low-boiling point organic solvents include but not limited to: methanol, ethanol, propanol, isopropanol, acetone, methyl ethyl ketone, ethyl ether, tetrahydrofuran, dioxane, dichloromethane, chloroform, carbon tetrachloride, cyclohexane, petroleum ether, ethyl acetate, methyl acetate, butyl acetate, isobutyl acetate, sec-butyl acetate, ethyl formate, propyl formate, butyl formate, isobutyl formate, sec-butyl formate or their mixtures.

Said low-boiling point organic solvent is preferably selected from methanol, ethanol, propanol, isopropanol, acetone, acetonitrile, petroleum ether, cyclohexane, or their mixtures, and more preferably methanol, ethanol, propanol, isopropanol, or their mixtures.

Alkali may be added during cyclization to promote the reaction. Said alkali may include but not limited to: sodium carbonate, sodium bicarbonate, potassium carbonate, potassium bicarbonate, lithium carbonate, lithium bicarbonate, ammonium carbonate, ammonium bicarbonate, sodium phosphate, disodium hydrogen phosphate, potassium phosphate, dipotassium hydrogen phosphate, ammonium phosphate, diammonium hydrogen phosphate, lithium phosphate, dilithium hydrogen phosphate, sodium acetate, potassium acetate, lithium acetate, ammonium acetate, sodium oxalate, potassium oxalate, lithium oxalate, ammonium oxalate, sodium hydroxide, potassium hydroxide, aluminum hydroxide and lithium hydroxide.

Said alkali is preferably sodium carbonate or sodium bicarbonate.

The addition amount of alkali is not special restrictions. However, the molar ratio of compound (III) and alkalis is preferably 1:0.01-20, more preferably 1:0.05-10, more preferably 1:0.5-5, and still more preferably 1:0.5-2.5.

Sulfonation-decomposition reaction of the intermediate compound (IV):

The sulfonation-decomposition reaction is carried out under the temperature of 10° C.-120° C.

The intermediate compound shown in the general formula (IV) is sulfonated with fuming sulfuric acid ($SO_3.H_2SO_4$) containing 5-30%$SO_3$ or chlorosulfonic acid under the heat, and simultaneously decomposition reaction is carried out to obtain a mixture. Said mixture comprises the compounds shown in the general formula (V), (VI), (VII). Sulfonation and decomposition are simultaneously carried out. Multiple decomposition reactions can simultaneously happen during the decomposition process. The number m of sulfonic group in the aforementioned compounds is relation to the content of sulfur trioxide in fuming sulfuric acid and the sulfonation temperature. When at the low content and low temperature, obtaining the compound with m is 1. When at the higher content and temperature, obtaining the compound with m is 2.

It can be seen from the reaction formula that IV is sulfonated and decomposed to generate products V, VI, VII, wherein when IV is decomposed into VI and VII, the reaction byproducts comprise $R_8OH$ and water.

Sulfonation and decomposition of the intermediate compound (IV) are carried out by using fuming sulfuric acid or chlorosulfonic acid under stirring.

The reaction formula of the sulfonation and decomposition process is as follows:

(IV) to chlorosulfonic acid, but the molar ratio of the dry intermediate (IV) to chlorosulfonic acid preferably 1:3-50, and more preferably 1:5-30.

The temperature for sulfonation with chlorosulfonic acid is preferably 20° C.-100° C., more preferably 10° C.-80° C., still more preferably 20° C.-60° C.

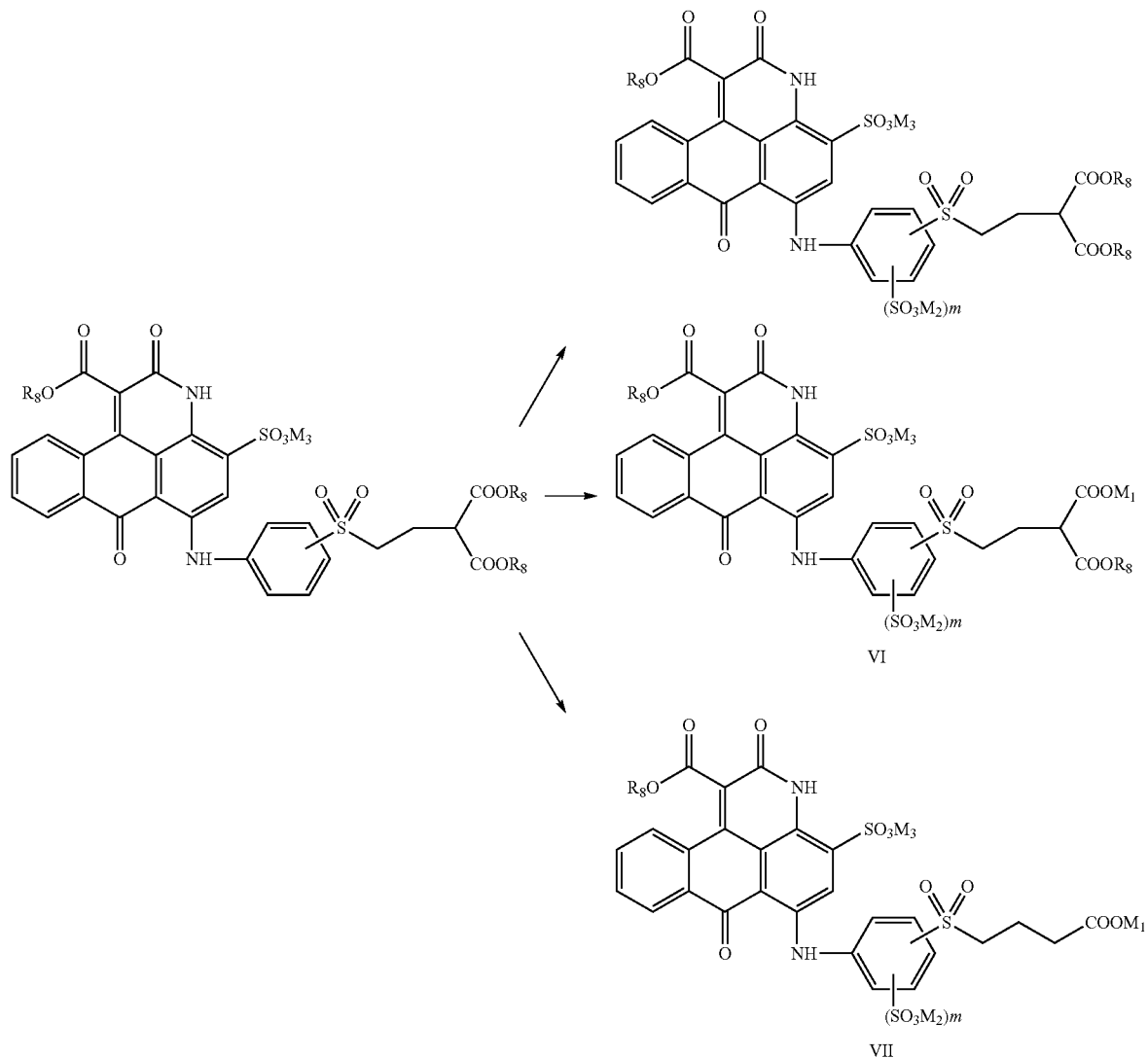

When fuming sulfuric acid is used for sulfonation, the sulfur trioxide content in the fuming sulphuric acid is 5-30%, preferably 5-20%, more preferably 6-15% and the most preferably 7-13%.

It is no specific restrictions about the dosage ratio of the intermediate (IV) to fuming sulfuric acid, the weight ratio of dry intermediate (IV) to fuming sulfuric acid is preferably 1:5-50, more preferably 1:20, further more preferably 1:15, and still most preferably 1:10.

The temperature for sulfonation with fuming sulfuric acid is preferably 10° C.-100° C. and more preferably 40° C.-90° C.

When chlorosulfonic acid is used for sulfonation, it is no specific restrictions about the dosage ratio of the intermediate The reaction time is preferably 2-4 h and more preferably 3-4 h, after which the reaction ends.

The end of the reaction can be determined by intra-industry regular methods, e.g., liquid chromatography or thin layer chromatography. When using liquid chromatography to control end of reaction, determine the end of reaction by using the method of reversed phase ion pair according to the peak retention time of the raw material and the sulfonated product.

The mixture of the compounds shown in the general formula (IV) can be obtained through the above steps. The variety and ratio of the sulfonated product based on the general formula (IV) compound in the mixture depends on the reaction temperature and time. In the range of the reaction temperature (10° C.-120° C.) and time (2-4 h) of the present invention, the specific compounds shown in the general formula (IV) can be formed. In the mixture product, the ratio of each specific compound can change within a range of 0-100%, but cannot be 0% or 100% simultaneously, and the sum of the contents of the compounds in each mixture product is 100% based on the total weight of the mixture product.

The non-limited specific examples of the prepared sulfonated product based on the compounds shown in the general formula (IV) are as follows:

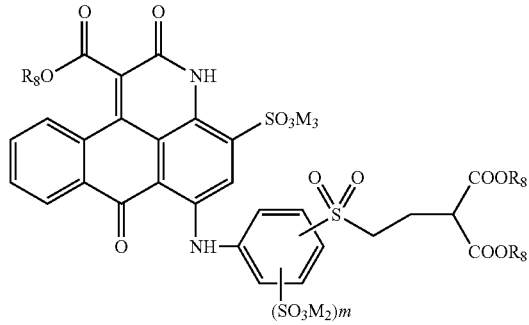

VI

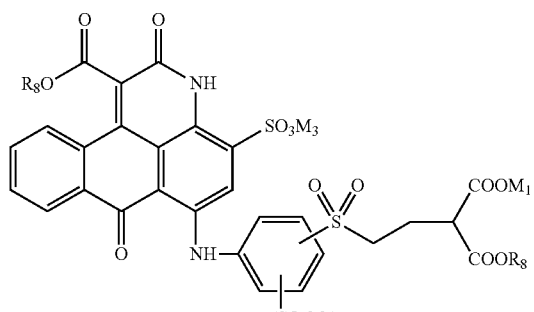

VII

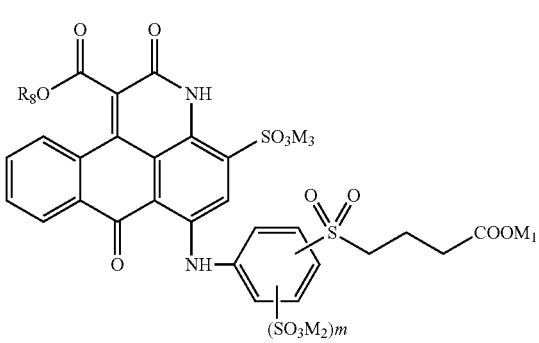

Hydrolysis Reaction

The mixtures obtained by sulfonation and decomposition reaction are hydrolyzed at the acid condition or the alkaline condition.

Hydrolysis at acid condition: heated the mixtures obtained by sulfonation and decomposition reaction to 40° C.-80° C., and hydrolysis 1.5-5 h. Then neutralized the sulfuric acid in the sulfonation liquid using alkali, finally obtained solution of the compound shown in the general formula (I') ($M_4$ is H).

Hydrolysis at alkaline condition: neutralized the mixtures obtained by sulfonation and decomposition reaction using alkali to neutral, then adjusted pH using alkali (for example $M_4OH$) to 9-10 emerging alkalescence, then heated to 40° C.-80° C., hydrolyzed 1.5-5 h, finally obtained solution of the compound shown in the general formula (I').

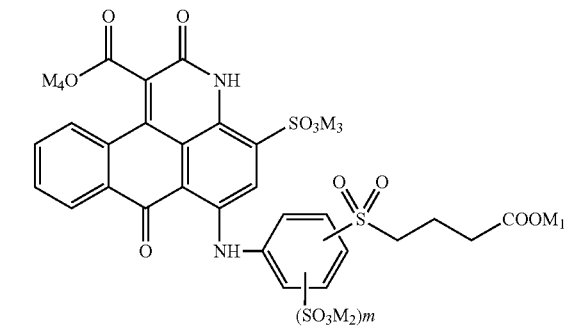

I'

In the hydrolysis reaction, the (V), (VI), (VII) compounds are changed to the compound shown in the general formula (I'). The reaction by-product contain $R_8OH$, $H_2O$, and $CO_2$. The final result of hydrolysis at acid condition and at alkaline condition is consistent, just operation and $M_4$ is different. In the hydrolysis reaction at acid condition, $M_4$ is H, may be neutralized and changed to other $M_4$ cation.

The hydrolysis temperature is preferably 40° C.-80° C., more preferably 40° C.-70° C., more preferably 50° C.-70° C., and more preferably 60° C.-70° C.

The hydrolysis method is preferably hydrolysis at acid condition and at alkaline condition, more preferably hydrolysis at acid condition.

The hydrolysis time is preferably 1.5-5 h, more preferably 1.5-4 h, more preferably 1.5-3 h, and more preferably 1.5-2 h.

The alkali ($M_4OH$) using in the hydrolysis reaction includes but not limited to the following: sodium hydroxide, calcium hydroxide, potassium hydroxide, ferric hydroxide, copper hydroxide, sodium carbonate, sodium bicarbonate, potassium carbonate, potassium bicarbonate, lithium carbonate, lithium bicarbonate, ammonium carbonate, ammonium bicarbonate etc. It is preferably sodium hydroxide, calcium hydroxide, potassium hydroxide, ferric hydroxide, and more preferably sodium hydroxide, potassium hydroxide, calcium hydroxide, and more preferably sodium hydroxide, calcium hydroxide, more preferably calcium hydroxide.

Benzylation (or Naphthyl Methylation) Reaction

The compound shown in the general formula (II) (or The compound shown in the general formula (II')) is obtained by benzylation (or naphthyl methylation) reaction using benzylation (or naphthyl methylation) reagent and solution of the compound shown in the general formula (I') obtained in the hydrolysis reaction under the condition of definite temperature, pH, rate of charge, reaction time.

The reaction formula of benzylation (or naphthyl methylation) reaction is as follows:

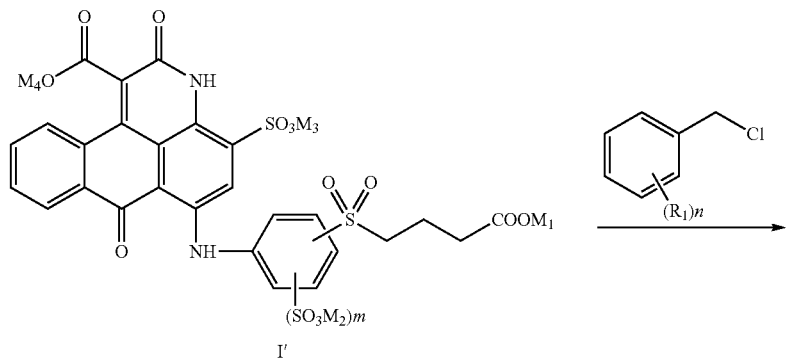

I'

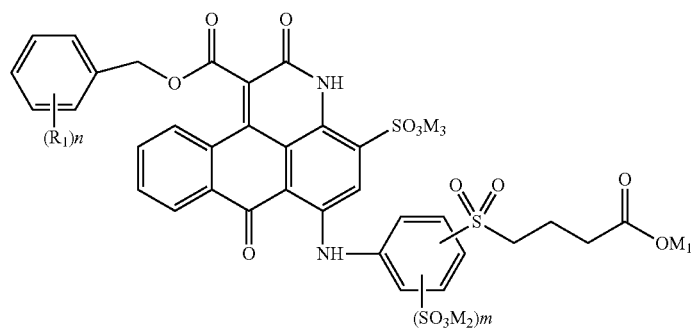

II

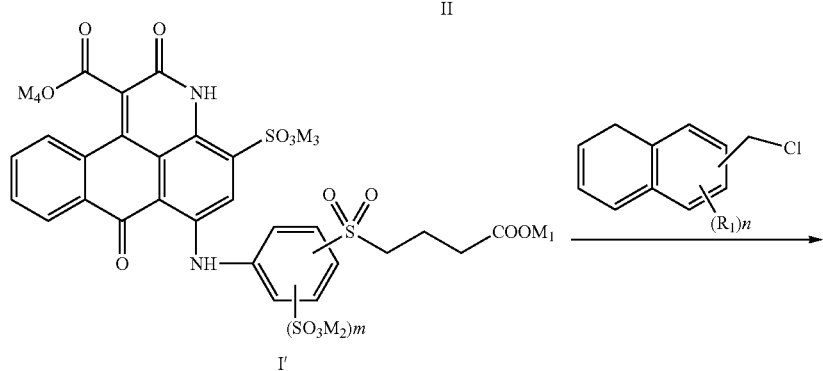

I'

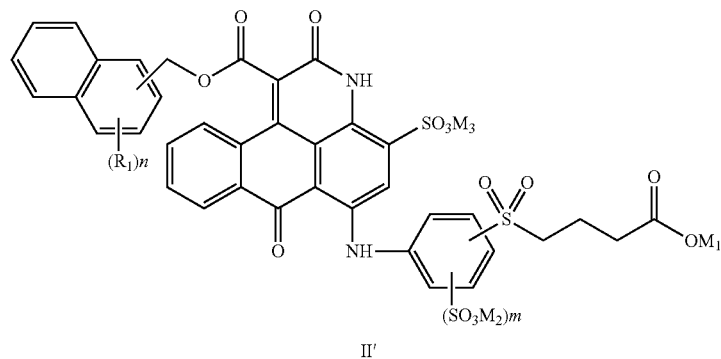

II'

In the above reaction formula, $R_1$ is H, $C_{1-6}$ alkyl group, CN, $NO_2$, $SO_3H$ or $SO_3M_5$, F, Cl, Br, $CO_2H$, $CO_2M_6$, $CO_2R_2$, or $NHCOR_3$; $R_2$ is H or $C_{1-6}$ alkyl group; $R_3$ is H or $C_{1-6}$ alkyl group; $M_1$, $M_2$, $M_3$, $M_4$, $M_5$, $M_6$ are respectively cation or cationic groups; $(R_1)n$ and $(SO_3M_2)_m$ may locate any position of the benzene ring, of which m is an integer of 0-2, preferably an integer of 1-2, n is an integer of 0-2.

Benzylation reagent include but not limited to: benzyl chloride, benzyl bromine, 4-methyl benzyl chloride, 4-methyl benzyl bromine, 3-chlorobenzyl cyanide, 3-bromobenzyl cyanide, 3-sulfonic acid group benzyl chloride, 3-sulfonic acid group benzyl bromine, 3-nitro benzyl chloride, 3-nitro benzyl bromine, 3-chlorobenzyl chloride, 3-chlorobenzyl bromine, 4-acetamidobenzoyl chloride, 4-methyl-3-sulfonic acid group benzyl chloride etc.

Naphthyl methylation reagent include but not limited to: substituted or unsubstituted chloromethyl naphthalene, substituted or unsubstituted bromomethyl naphthalene, of which chloromethyl or bromomethyl may locate α position or β position of the naphthalene ring.

The temperature of benzylation (or naphthyl methylation) reaction is preferably 70° C.-150° C., more preferably 70° C.-130° C., more preferably 70° C.-120° C., more preferably 70° C.-110° C., more preferably 70° C.-100° C.

The pH of benzylation (or naphthyl methylation) reaction is preferably 0-12, more preferably 3-12, more preferably 5-10, more preferably 6-10, more preferably 7-9. The mole rate of charge of benzylation reaction (Formula I': benzylation reagent) is preferably 1:1-100, more preferably 1:1-80, more preferably 1:1-70, more preferably 1:1-60, more preferably 1:1-50, more preferably 1:1-40 The mole rate of charge of naphthyl methylation reaction (Formula I': naphthyl methylation) is preferably 1:1-20, more preferably 1:1-10, more preferably 1:1-5, more preferably 1:1-3.

The reaction time of benzylation (or naphthyl methylation) reaction is preferably 120 h, more preferably 96 h, more preferably 72 h, more preferably 48 h, more preferably 24 h. The reaction time of benzylation reaction is preferably 1-120 h, more preferably 1-96 h, more preferably 1-72 h, more preferably 1-48 h, more preferably 1-24 h. The reaction time of naphthyl methylation reaction is preferably 0.5-10 h, more preferably 1-5 h, more preferably 1-3 h. The mixture obtained in benzylation (or naphthyl methylation) reaction can be used to prepare a salt mixture by means of salting out or salt conversion according to the conventional methods of the industry.

In a preferred embodiment, sulfonated and decomposed products are poured into ice water after the sulfonation-decomposition reaction while stirring and controlling the temperature below 40° C. Then salting out or salt conversion can be carried out to obtain the salt mixture.

Preferably, inorganic salts can be used to salt out the compounds of general formula (I) to form the salt. Said inorganic salts may preferably include but not limited to ammonium chloride, sodium chloride, lithium chloride, etc., or their mixtures.

In the salting-out step of the benzylation (or naphthyl methylation) products, preferably several times of salting-out can be carried out to obtain the salt mixture of the compounds of general formula (I).

Another non-limiting specific mode of operation is as described below. For example, by salting out with table salt sodium chloride and filtering, wet cake containing sodium salt can be obtained. Dissolve the wet cake in water, add hydrochloric acid to adjust the pH value to 1-2, and filter the solution to obtain crystals and thus obtain the mixture of compounds of general formula I in the form of free acid (or part of which may be direct sodium salts). Stir the wet cake of the free acids in water, add alkalis such as potassium hydroxide, lithium hydroxide, ammonia, organic amines and so on for neutralization, and then add salts to obtain potassium salt, lithium salt, ammonium salt or organic ammonium salt correspondingly. Among these salts, lithium salt, sodium salt and ammonium salt are preferred.

In another non-limiting specific mode of operation, water and lime (calcium hydroxide) can be added into the sulfonated products which have been cooled in the ice water to neutralize the sulfuric acid in the reaction system below 40° C. to neutral pH and form calcium sulfate precipitation; filter and wash the filter cake to be colorless, combine the filtrate and the washing liquor, add NaOH to reach a pH of 12-14, stir for 2 h, and neutralize with citric acid; filter out the precipitate to obtain the sodium salt mixture of compounds of general formula (I), and then concentrate and separate it.

The present invention is capable of separating salt mixture of compounds of general formula (I) obtained in the above procedures. The separation can be done by conventional means, such as adsorption chromatography method, stepwise salting out, reversed phase ion-pair chromatography, and so on.

Taking reversed phase ion-pair chromatography as an example, tetrabutylammonium bromide, tetrabutylammonium iodide, triethylammonium acetate and the like can be combined with the sulfonic acid groups on the dye molecules to form hydrophobic ion pairs. As dyes vary in the polarity, the number of sulfonic acid groups contained and the molecular weight, their ions have different capacity of absorbing adsorbents (such as octadecylsilanized fillers). Therefore, by using the methanol/water eluent and the gradient elution technique, the compounds in the mixture can be separated according to the order of elution of the reversed-phase ion in the column Specifically: First, strong polar solvents containing more water and less methanol (e.g., 5% methanol) can be used to elute products of strong polarity, more sulfonic acid groups and small molecular weight; gradually increase the proportion of methanol (from 5% to 100%) to finally elute products of weak polarity, less sulfonic acid groups and high molecular weight. Different purified products, i.e., salts of compounds of general formula (1), can thus be separated according to the different elution order and by collecting the eluent at different time intervals.

Separated salts of the compounds can also be desalted to obtain corresponding compounds of formula (I).

Desalting can be done by conventional methods of the industry, such as high pressure reverse osmosis membrane method.

In fact, the mixture product can be directly used in practice without separation. Sometimes the application effects of the mixture are even better than the purified compounds, as the mixture generally feature high solubility, high color density and full printing color. Said mixture may consist of compounds of general formula (I) and salts thereof.

In the above-described synthesis method of the present invention, the blue commercial dye compounds of general formula (III) and (III') used as a raw material can be prepared from commercial reactive dyes in alkaline conditions by heating in water or an organic solvents by conventional methods. For example, the commercially available Reactive Blue 19 with sulfone groups at the meta-position of the amino groups can be converted to III-RB 19 III'-RB19 in alkaline conditions by conventional methods, corresponding to III or U. The products can further react with malonic acid diester to form IV-RB 19, corresponding to intermediate IV ($R_8$ is ethyl) Similarly, blue dyes with sulfone groups at para-position of the amino groups can be used as the starting material. .

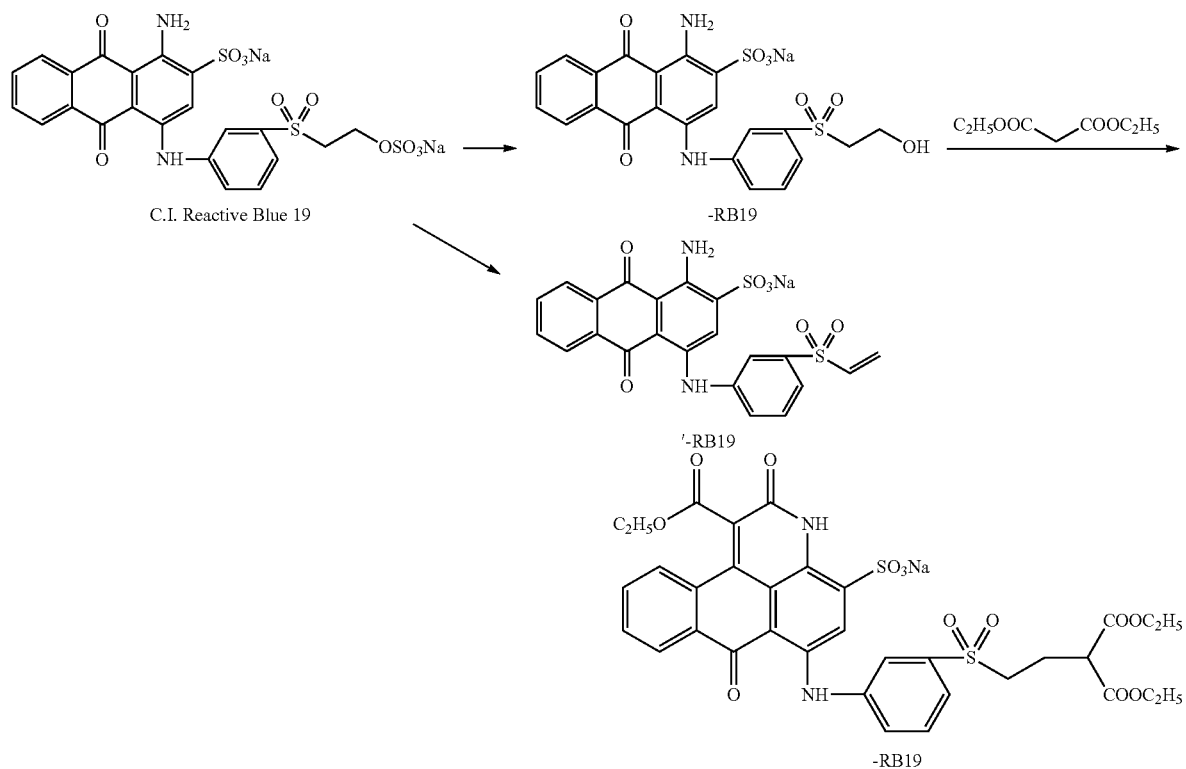
Specific examples of compounds of general formula (I) obtained by the above methods include the followings (however, the present invention is not limited to compounds of these structures):
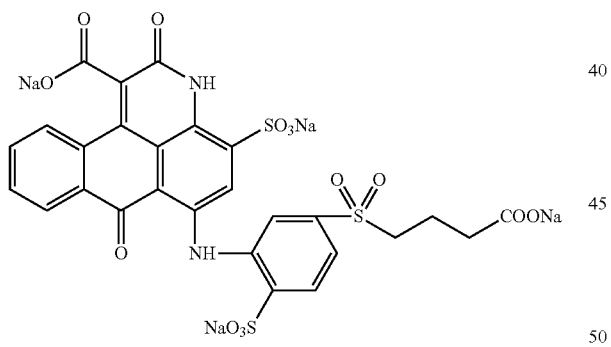
Dm1
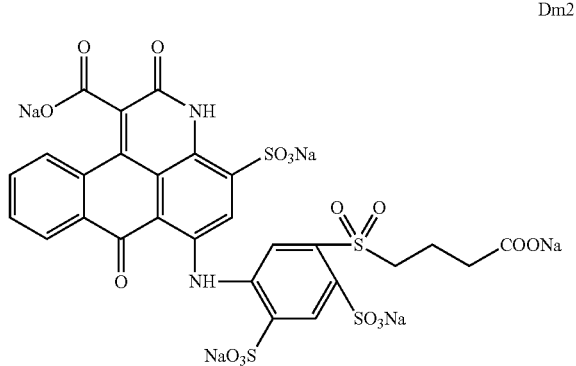
Dm2
-continued
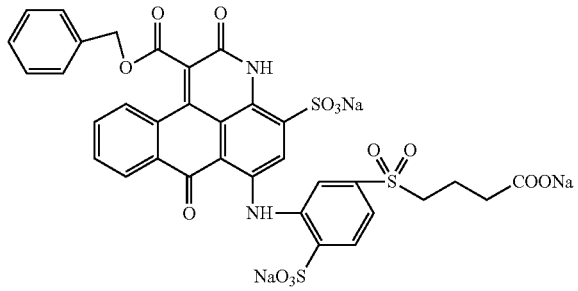
Dm3
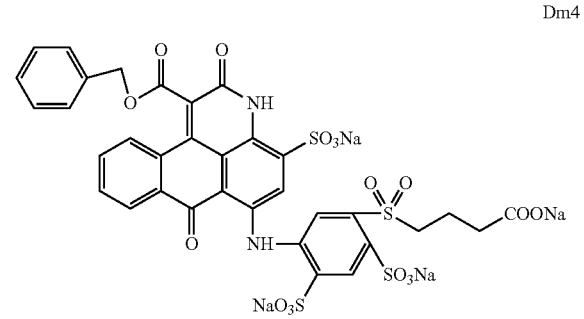
Dm4

-continued
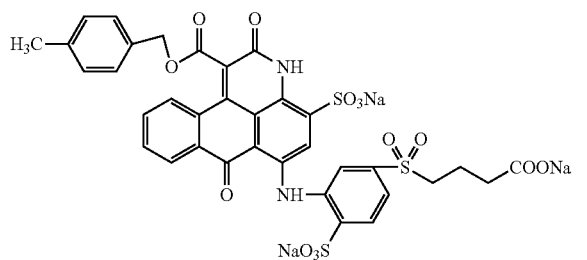
Dm5
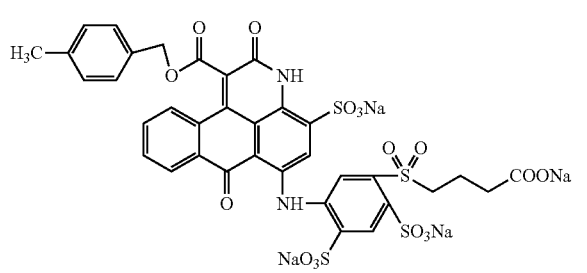
Dm6
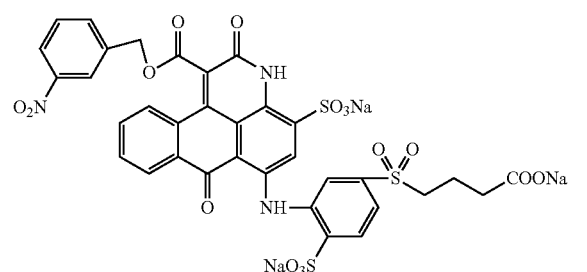
Dm7
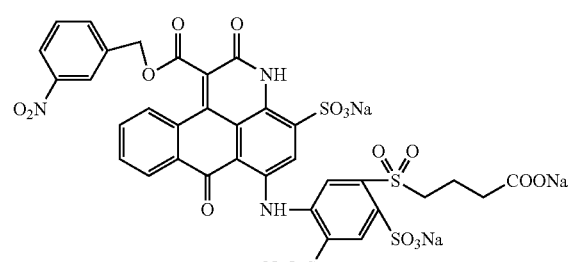
Dm8
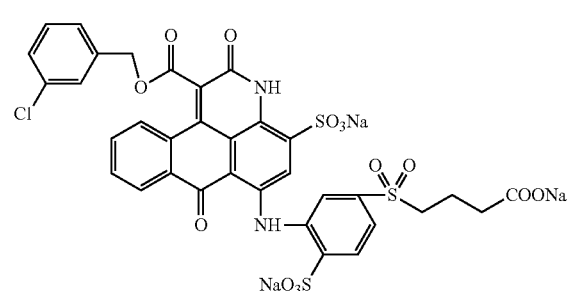
Dm9
-continued
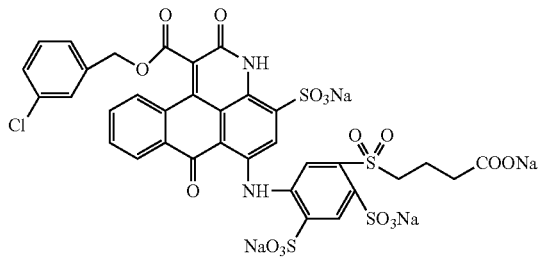
Dm10
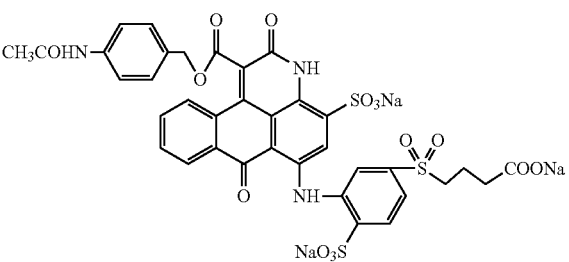
Dm11
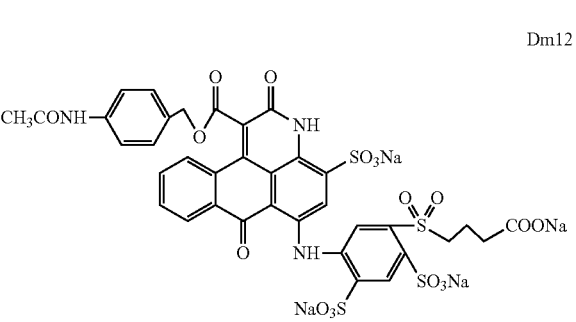
Dm12
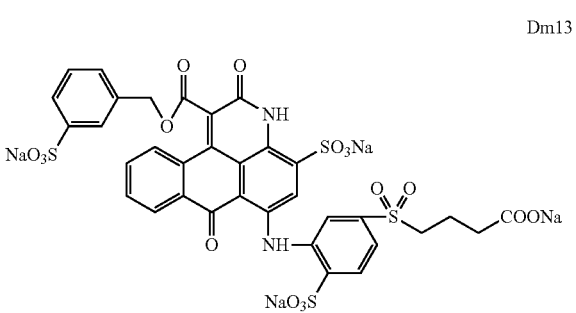
Dm13
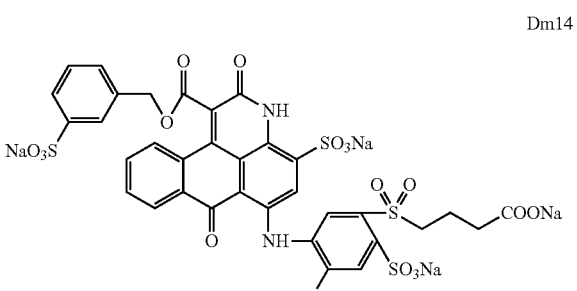
Dm14

Dm15
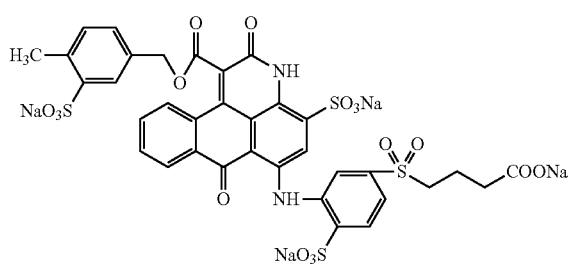
Dm16
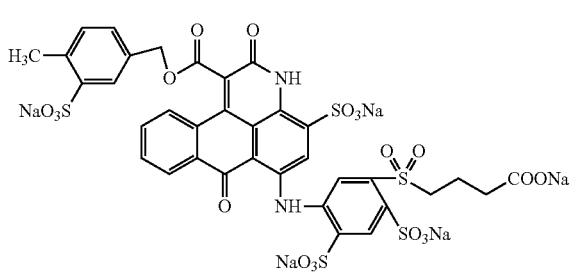
Dm17
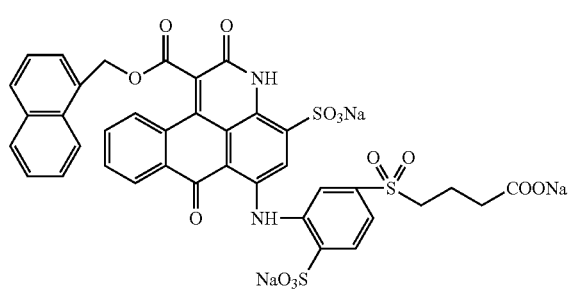
Dm18
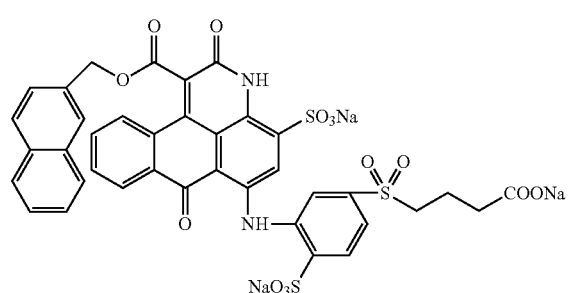
Dp1
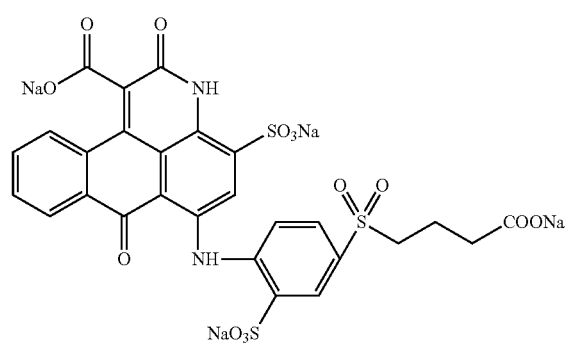
Dp2
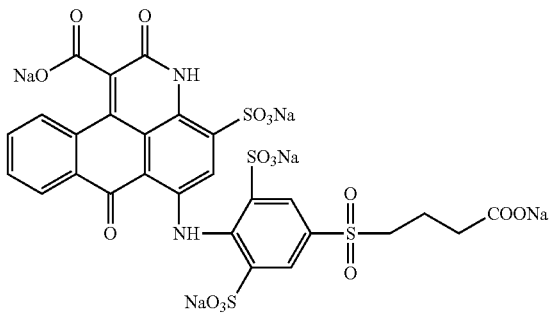
Dp3
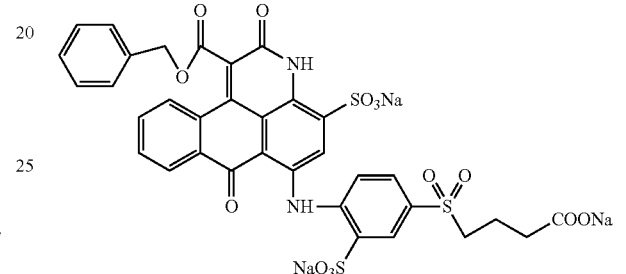
Dp4
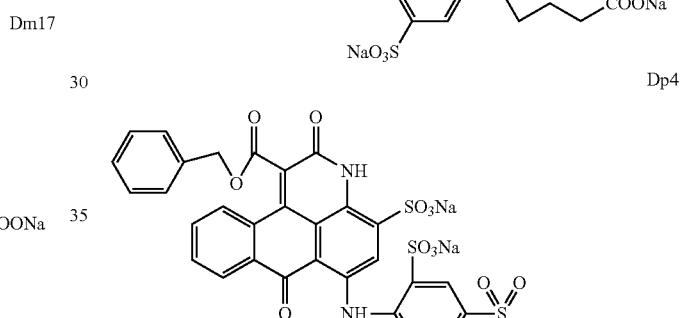
Dp5
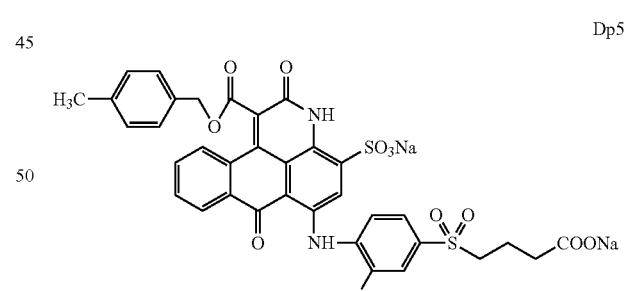
Dp6
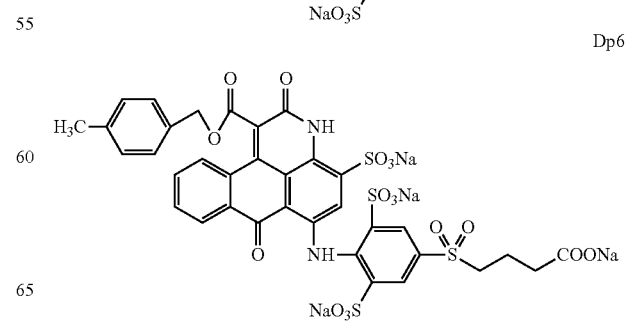

Dp7
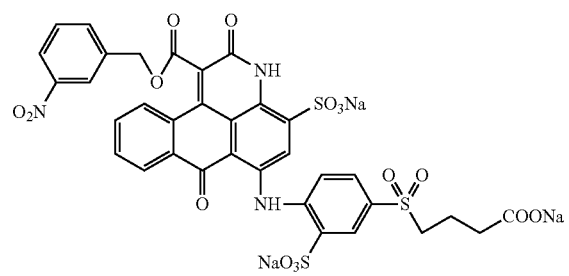
Dp8
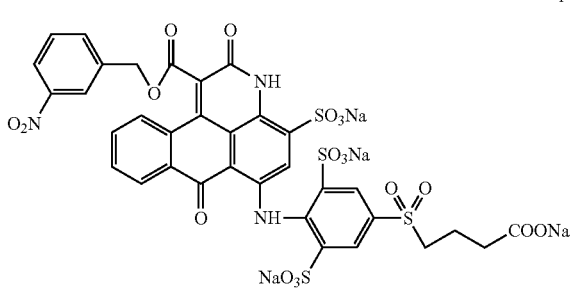
Dp9
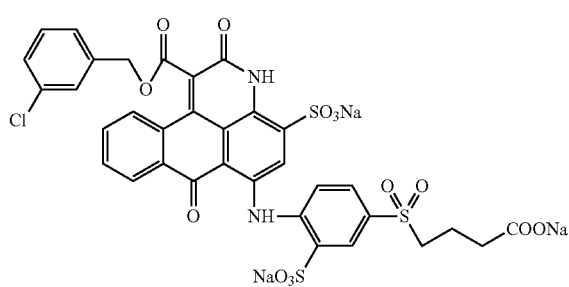
Dp10
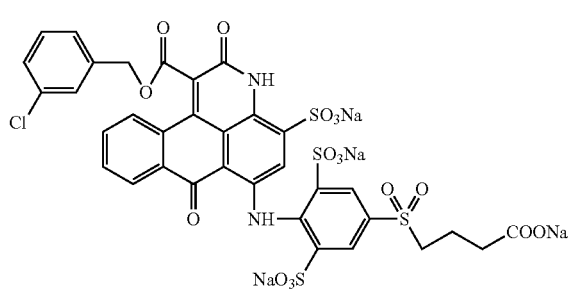
Dp11
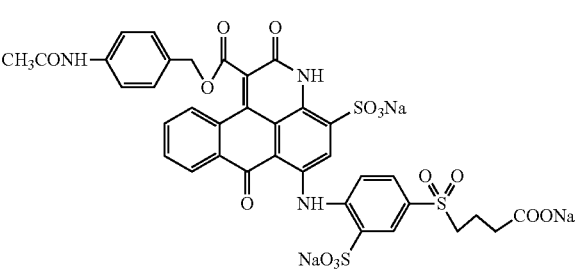
Dp12
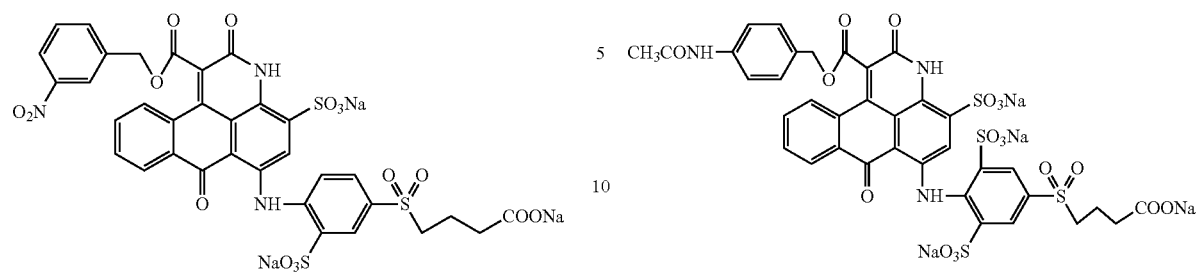
Dp13
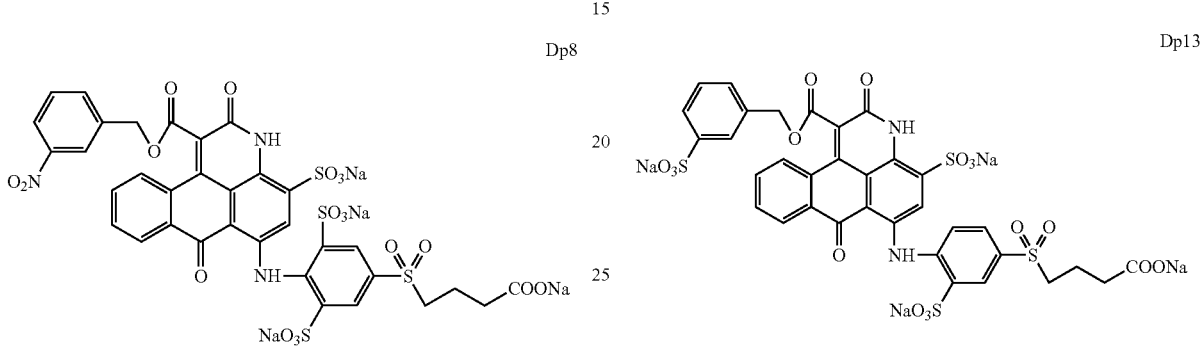
Dp14
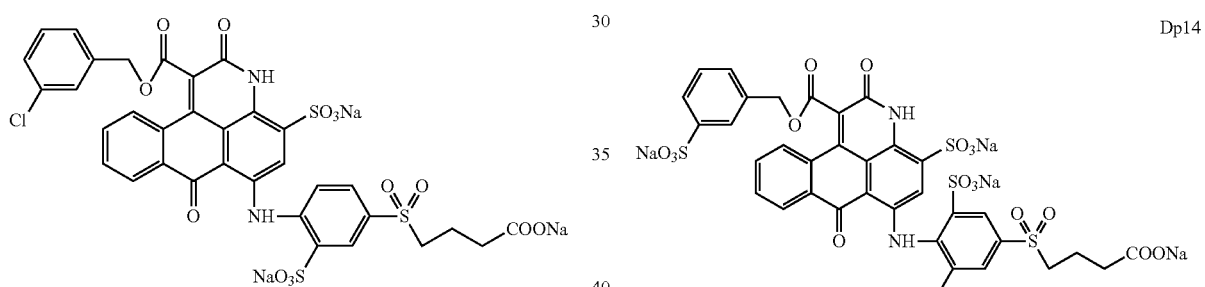
Dp15
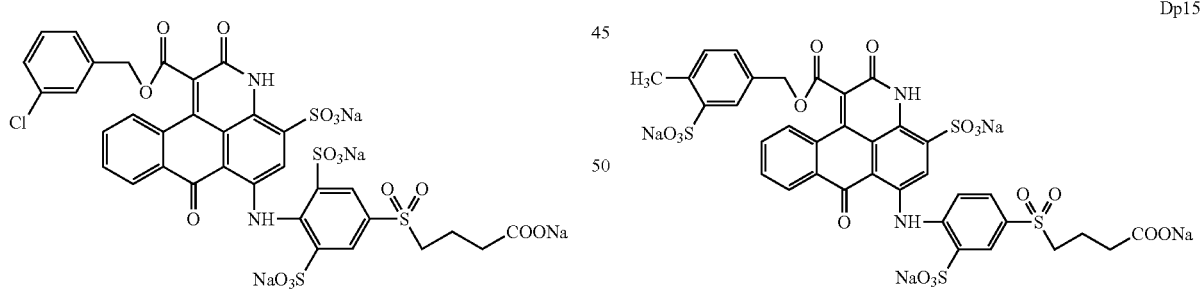
Dp16
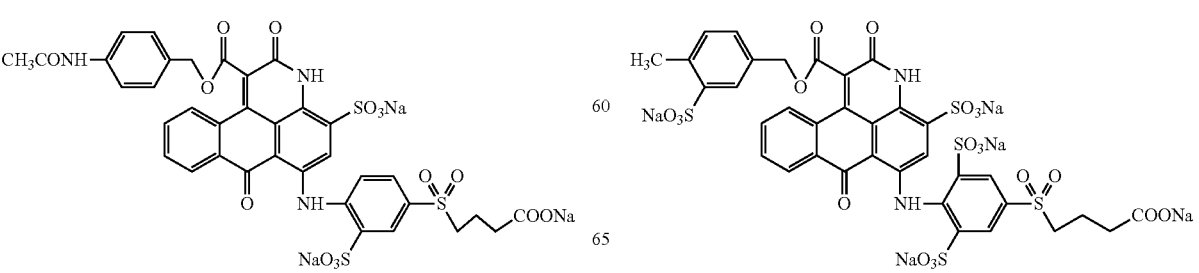

-continued

Dp17
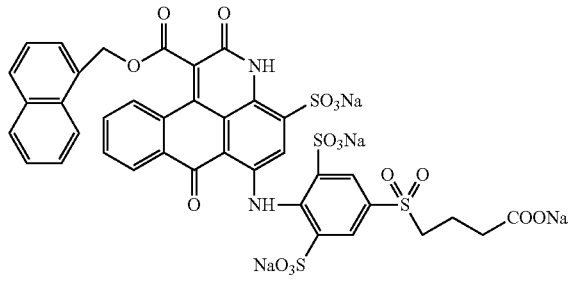

Dp18
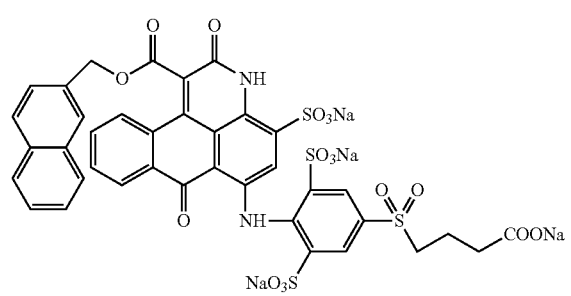

Product obtained by the above methods, i.e.: Compounds of general formula (I) or mixtures thereof, wherein the inorganic salt volume is preferably less than 1 wt %. Conventional methods like high pressure reverse osmosis membrane can be used for desalting of the dyes to reach the salt content.

The compounds of general formula (I) or their mixtures of the present invention, which can be used as dyes and dissolved in water or aqueous solvents (water containing the following water-soluble organic solvents) to produce ink compositions. Dosage of dye compounds of the present invention is generally 0.1-20 wt %, preferably 1-20 wt %, more preferably 1-15 wt %, and further more preferably 2-10 wt %.

Said ink composition also contains 0-50 wt % of water-soluble or water-miscible organic solvents, preferably 5-50 wt % and 0-5 wt % of ink control agents. The rest component is water. The above proportions are based on the total weight of the ink composition.

Examples of above-mentioned water-soluble or water-miscible organic solvents which can be used in the present invention include: $C_1$ to $C_4$ alkanols, including Methanol, Ethanol, n-propanol, Isopropanol, n-butanol, Isobutanol, 2-butanol, tert-butanol, etc.; carboxylic acid amides, including N,N-dimethylformamide, N,N-dimethylacetamide, etc.; lactams, including 2-pyrrolidone, N-methyl-2-pyrrolidone, etc; ethylene glycol, 1, 2- or 1,3-propanediol, 1,2- or 1,4-butanediol, 1,6-hexanediol, diethylene glycol, triethylene glycol, tetraethylene glycol, dipropylene glycol, thiodiglycol, polyethylene glycol; polyols (trihydric alcohols), including Glycerine, Hexane-1,2,6-triol, etc.; $C_1$-$C_4$ alkylether of polyols, including ethylene glycol monomethyl ether or ethylene glycol monoethyl ether, diethylene glycol monomethyl ether, diethylene glycolmonbutyl ether, diethylene glycol monoethyl ether, triethylene glycol monomethyl ether, triethylene glycol monoethyl ether, etc.; γ-butyrolactone or dimethyl sulfoxide, etc. These organic solvents can be used alone or in combination.

In these organic solvents, 2-pyrrolidone, N-methyl-2-pyrrolidone, ethylene glycol, diethylene glycol or triethylene glycol and dipropylene glycol are preferred; 2-pyrrolidone, N-methyl-2-pyrrolidone and diethylene glycol are more preferred.

Other ink additives include: Anticorrosives, anti-mildew agents, pH adjusting agents, chelating reagent, rust inhibitors, water-soluble UV absorbers, water soluble polymers, dye solvents, surface active agents, etc.

The ink composition of the present invention is prepared by dissolving the dye compounds of general formula (I) or mixtures thereof into water or the above-mentioned aqueous solvents (water containing water-soluble organic solvents) or water-miscible organic solvents with the above mentioned ink control agents as necessary.

It is no specific restrictions about the order of dissolution of the components in the above preparation methods. The dyes can be preliminarily dissolved in water or the above described aqueous solvents (water containing water-soluble organic solvents) with addition of ink control agents, or the dyes can be firstly dissolved in water followed by addition of aqueous solvents and ink control agents. Other orders are allowed. The ink composition can also be prepared by adding aqueous solvents and ink control agents to the reaction liquid containing the dyes or solution containing the colourant desalted by the reverse osmosis membrane method. Water used for preparation of the ink composition is preferably deionized water with less impurity, such as ion exchange water or distilled water. Membrane filter can be used for microfiltration to remove inclusions. The filter membrane pore size is generally 1 micron to 0.01 micron, preferably 0.8 microns to 0.2 microns.

The magenta ink compositions containing carbonyl propyl sulfurylanthrapyridone sulfonic acid compounds of the present invention or salts thereof or mixtures thereof are suitable for sealing, photocopying, marking, note-taking, drawing, stamping or printing, especially for ink-jet printing. The advantages include that the resulting images have excellent resistance to water, sunlight, ozone and friction and can also be used for toning, particularly, for composition of black dyes.

Examples of recording media applicable for the ink-jet printing method of the present invention include: Paper, copy paper, printing paper, films, fibers, leather, etc. The media is generally subject to surface treatment and an ink-absorbing layer is set in the substrate. For example, the ink-absorbing layer can be formed by dipping or coating cations and other polymers on the above mentioned substrate, and the coat contains porous silica, alumina sol or special ceramics, etc.; These white inorganics are coated on the above mentioned substrates together with polyvinyl alcohol, polyvinylpyrrolidone or other hydrophilic polymers. Thin sheets coated with such an ink absorbing layer are generally referred to as dedicated inkjet paper (film), glossy paper (film) or the like. Of course, ordinary paper can also be used.

Generally, images printed on the substrates coated with porous white inorganics as described above are subject to significant discoloration caused by ozone. However, due to the outstanding gas resistance, water-based magenta ink composition of the present invention has a special printing effect on such substrates.

Examples of porous white inorganics include: Calcium carbonate, kaolin, talc, clay, diatomaceous earth, synthetic amorphous silica, aluminum silicate, magnesium silicate, calcium silicate, aluminum hydroxide, alumina, lithopone stone, zeolite, barium sulfate, calcium sulfate, titanium dioxide, zinc sulfide, zinc carbonate, etc.

In ink-jet printing, in addition to common-used yellow and cyan ink composition, green ink composition, orange ink composition, blue (or purple) ink composition, and magenta ink composition are available. The dye compounds of the present invention can be used to prepare magenta ink composition. Where necessary, these different color ink compositions can be used in combination or to prepare black ink composition. The different color ink compositions are filled into corresponding ink cartridges, which are installed at the established position of the inkjet printer for printing. Examples of ink-jet printers include: Piezoelectric printers, thermal bubble jet printers, etc.

The magenta ink composition of the present invention is bright magenta in color, especially features highly bright tone on glossy inkjet paper as well as high fastness of printed images and safeness to human health.

No precipitation or separation will occur to the ink composition of the present invention during storage. The ink will not block the nozzles in ink-jet printing, either. Even used in continuous ink-jet printers for a relatively long fixed time or intermittently, the ink of the present invention is subject to no changes of physical properties.

Embodiments are provided below to detail the present invention. Unless otherwise specified, "parts" and "%" involved herein are based on weight.

Embodiments

Embodiment 1

(1) Add 100 parts of meta-CI Reactive Blue 19 and 490 parts of water into the reactor, stir, and then heat to 55° C.-60° C. Acids are generated during the reaction. Dilute sodium hydroxide solution is used to neutralize the resulting acid and promote the reaction, so that the reaction solution is maintained at pH 8.5-9.0. When the pH of the reaction solution basically gets stable, the reaction ends. High performance liquid chromatogram (HPLC) can also be used to determine whether the reaction is completed. After the completion of the reaction, adjust the pH to 9.0 and stir for 1 h. A large amount of solid, i.e., (III'-RB 19) compound, will be precipitated. Filter out and dry the solid, and 83.1 parts of compound III'-RB19 will be obtained, which is a blue purple powder. Mass spectrometry: III'-RB 19: m/z (-): 483.2 ([$\underline{M}$-H]$^{-1}$). The most abundant precise molecular mass ($\underline{M}$) of the intermediate dye product III'-RB 19 (as free sulfonic acid) is 484.2.

(2) Add 24.6 parts of the compound (III'-RB19), 1.5 parts of anhydrous sodium carbonate, 35.0 parts of diethyl malonate, 75.0 parts of o-dichlorobenzene and 20.0 parts of DMSO into the reactor, heat to 170° C. -175° C., and react for 10 h. Remove the resultant ethanol and water from the reaction system to promote the reaction. After determining the completion of the reaction with HPLC, cool the reaction solution, add 50 parts of isopropanol, stir for a while, and then pour the reaction solution into 150 parts of isopropyl while stirring. After stirring for half an hour, a large amount of solid, i.e., (IV-RB19) compound, will be precipitated; filter it out. Wash the resultant (IV-RB19) compound in 150 parts of isopropanol, and dry it to obtain 37.6 parts of purple crystalline (IV-RB19) compound. Mass spectrometry: IV-RB19: m/z (-): 739.0 ([$\underline{M}$-H]$^{-1}$).

The most abundant precise molecular mass ($\underline{M}$) of the intermediate dye product IV-RB19 (as free sulfonic acid) is 740.0.

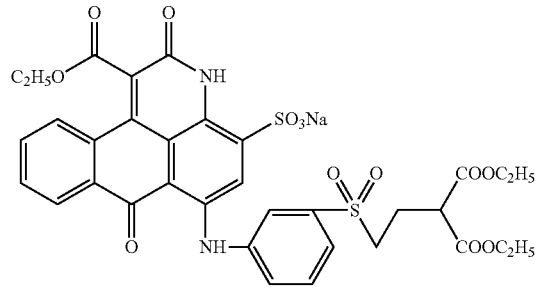

IV-RB19

(3) Add 35 parts of 10% fuming sulfuric acid into the reactor, place it in the ice water bath below 20° C., and add 10.6 parts of the (IV-RB19) compound; raise the temperature to 70° C. and carry out sulfonation reaction at the temperature for half an hour; raise the temperature to 80° C.-90° C., and carry out sulfonation reaction at the same temperature for 4 h. Pour the resulting reaction solution into 180 parts of ice to obtain highly acidic aqueous dye solution containing sulfuric acid.

(4) Heat the highly acidic aqueous dye solution containing sulfuric acid obtained at step (3) to 65° C. -70° C. and stir for 2 h for acid hydrolysis. After completion of the hydrolysis, add 35 parts of calcium hydroxide powder while stiffing to neutralize the unreacted sulfuric acid and obtain calcium sulfate precipitate. Stir for 1 h to completely neutralize to pH=7.0 and adjust the pH with dilute sodium hydroxide solution to 9.0. As heat will be generated in the neutralization process, ice water should be used to cool the reaction. Filter to remove the calcium sulfate precipitation, and an aqueous solution of the dye compound can be obtained. Remove inorganic salts by the high pressure reverse osmosis membrane method, and concentrate and dry to obtain 32 parts of pure sodium salt of the dye Dm1 compound. The maximum absorption of the sodium salt mixture is 527 nm (in aqueous solutions). Mass Spectrometry: m/z (3-): 229.7 ([$\underline{M}$-3H]$^{-3}$), m/z (2-): 345.2 ([$\underline{M}$-2H]$^{-2}$). In the free sulphonic acid form ($M_4$=H), the most abundant precise molecular mass ($\underline{M}$) is 692.1.

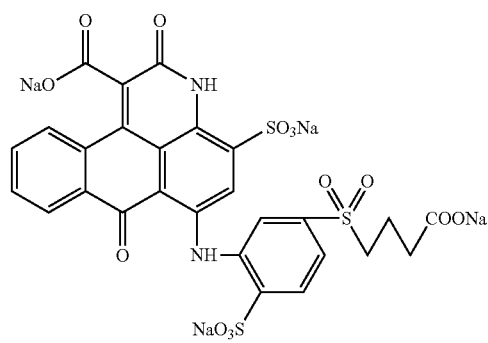

Dm1

Dissolve the sodium salt mixture of compound Dm1 in water, add acid to adjust the solution to be acidic, and then filter to obtain a cake. Dissolve the filter cake in water, and add potassium hydroxide, lithium hydroxide, ammonia, diethanolamine or triethanolamine to obtain potassium salt, lithium salt, ammonium salt, diethanolamine salt or triethanolamine salt of the compound respectively, in addition to the sodium salt.

Embodiment 2

Take part of the aqueous solution of the compound Dm1 obtained in Embodiment 1 (containing 9.9 parts of the dye Dm1), heat to 75° C. −80° C., adjust the pH to 9.0 and dropwise add 9.0 parts of benzyl chloride in 0.5 h for reaction for 3 h; dropwise add 4.5 parts of benzyl chloride in 5 min for reaction for 2 h; and then dropwise add 4.5 parts of benzyl chloride in 5 min for reaction for 4 h. Throughout the course of the reaction, use a dilute solution of sodium hydroxide to constantly adjust pH=9.0. After the completion of the reaction, add 40 parts of sodium chloride while stirring for salting; stir for 1 h and place for 2 h. Filter and dry the resulting product to obtain 11.2 parts of sodium salt mixture of compound Dm3, which is a red powder. The maximum absorption of the sodium salt mixture is 536 nm (in aqueous solutions). Mass spectrometry: m/z (3-): 259.6 ($[\underline{M}\text{-3H}]^{-3}$), m/z (2-): 390.2 ($[\underline{M}\text{-2H}]^{-2}$). The most abundant precise molecular mass ($\underline{M}$) of the intermediate dye product Dm3 (as free sulfonic acid) is 782.1.

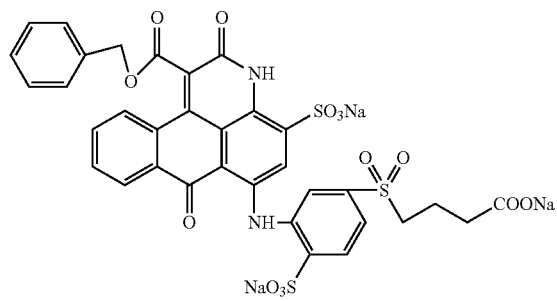

Dm3

Dissolve the sodium salt mixture of compound Dm3 in water, add acid to adjust the solution to be acidic, and then filter to obtain a cake. Dissolve the filter cake in water, and add potassium hydroxide, lithium hydroxide, ammonia, diethanolamine or triethanolamine to obtain potassium salt, lithium salt, ammonium salt, diethanolamine salt or triethanolamine salt of the compound respectively, in addition to the sodium salt.

Embodiment 3

Prepare the highly acidic aqueous solution containing sulfuric acid in the same way as in Step 1, Step 2 and Step 3 of Embodiment 1, add 35 parts of calcium hydroxide powder while stirring to neutralize the excessive sulfuric acid and stir for 1 h until complete neutralization; remove the calcium sulfate solid by filtration, adjust the filtrate with dilute sodium hydroxide solution to pH=9.0, heat filtrate to 65° C. −70° C., and stir for 2 h for alkaline hydrolysis. The hydrolysis is completed after 2 h and an aqueous solution containing Dm1 is obtained. Remove the inorganic salts by the high-pressure reverse osmosis membrane method, and concentrate and dry to obtain 32 parts of pure dye Dm1 compound.

Embodiment 4

Prepare the intermediate III'-RB 19' from C.I. active blue 19' with sulfone groups at para-position of the amino groups by the same method used in Step 1 of Embodiment 1. Mass spectrometry: III'-RB19' m/z (−): 483.2 ($[\underline{M}\text{-H}]^{-1}$). The most abundant precise molecular mass ($\underline{M}$) of the intermediate dye product III'-RB 19' (as free sulfonic acid) is 484.2. Prepare the intermediate IV-RB 19' by the same method used in Step 2 of Embodiment 1. Mass spectrometry: m/z (−): 739.0 ($[\underline{M}\text{-H}]^{-1}$). The most abundant precise molecular mass ($\underline{M}$) of the intermediate dye product IV-RB 19' (as free sulfonic acid) is 740.0.

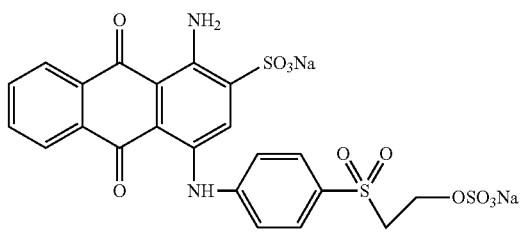

C.I. reactive blue 19'

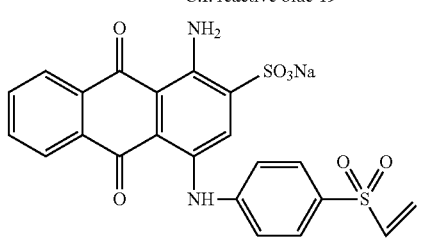

III'-RB19'

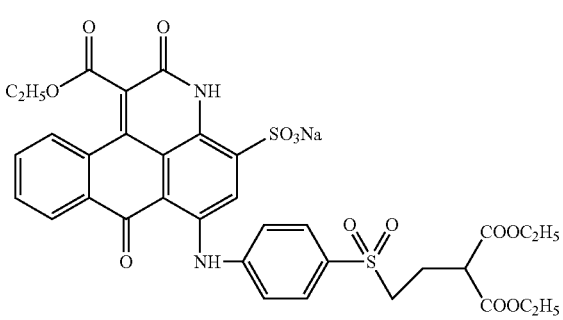

IV-RB19'

Sulfonate with 35 parts of 12% fuming sulfuric acid by the same method used in Step 3, and then obtain 35 parts of the sodium salt of Dp2 product by the acid hydrolysi and purification methods used in Step 4 of Embodiment 1. The maximum absorption of the sodium salt mixture is 528 nm (in aqueous solutions). Mass spectrometry: m/z (3-): 256.4 ($[\underline{M}\text{-3H}]^{-3}$), m/z (2-): 385.2 ($[\underline{M}\text{-2H}]^{-2}$). The most abundant precise molecular mass ($\underline{M}$) of product Dp2 (as free sulfonic acid) is 772.1.

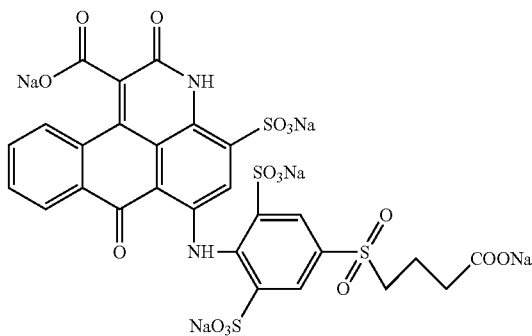

Dp2

Embodiment 5

Carry out benzylation by the same method used in Embodiment 2 and salting-out with sodium chloride to obtain the sodium salt of Dp4. Mass Spectrometry: m/z (3-): 287.3 ([M-3H]$^{-3}$), m/z (2-): 430.2 ([M-2H]$^{-2}$) The most abundant precise molecular mass (M) of the dye product Dp4 (as free sulfonic acid) is 862.1.

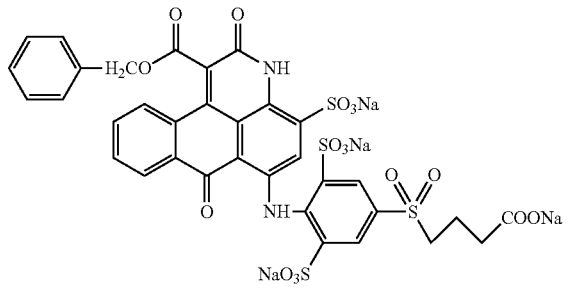

Dp4

Dissolve the sodium salt mixture of compound Dp4 in water, add acid to adjust the solution to be acidic, and then filter to obtain filter cake. Dissolve the filter cake in water, and add potassium hydroxide, lithium hydroxide, ammonia, diethanolamine or triethanolamine to obtain potassium salt, lithium salt, ammonium salt, diethanolamine salt or triethanolamine salt of the compound respectively, in addition to the sodium salt.

Embodiment 6

Take part of the aqueous solution of the obtained compound Dm1 (containing 9.9 parts of Dm1), heat to 75° C. –80° C., adjust the pH to 9.0 and dropwise add 10.0 parts of 4-methylbenzyl chloride in 0.5 h for reaction for 3 h; dropwise add 5.0 parts of 4-methylbenzyl chloride in 5 min for reaction for 2 h; and then dropwise add 5.0 parts of 4-methylbenzyl chloride in 5 min for reaction for 4 h. Throughout the course of the reaction, use a dilute solution of sodium hydroxide to constantly adjust pH=9.0. After the completion of the reaction, add 40 parts of sodium chloride while stirring for salting; stir for 1 h and place for 2 h. Filter and dry the resulting product to obtain 11.4 parts of sodium salt mixture of compound Dm5, which is a red powder. The maximum absorption of the sodium salt mixture is 537 nm (in aqueous solutions). Mass Spectrometry: Dm5: m/z (3-): 264.6 ([M-3H]$^{-3}$), m/z (2-): 397.2 ([M-2H]$^{-2}$). The most abundant precise molecular mass (M) of the intermediate dye product Dm5 (as free sulfonic acid) is 796.1.

Dissolve the sodium salt of compound Dm5 in water, add acid to adjust the solution to be acidic, and then filter to obtain a filter cake. Dissolve the filter cake in water, and add potassium hydroxide, lithium hydroxide, ammonia, diethanolamine or triethanolamine to obtain potassium salt, lithium salt, ammonium salt, diethanolamine salt or triethanolamine salt of the compound respectively, in addition to the sodium salt.

Dm5

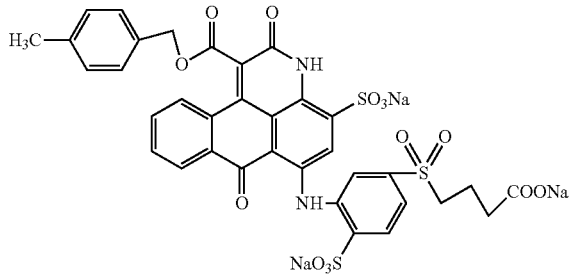

Embodiment 7

Take part of the aqueous solution of the obtained compound Dm1 (containing 9.9 parts of Dm1), heat to 75° C. –80° C., adjust the pH to 9.0 and dropwise add 12.2 parts of 3-nitro benzyl chloride in 0.5 h for reaction for 3 h; dropwise add 6.1 parts of 3-nitro benzyl chloride in 5 min for reaction for 2 h; and then dropwise add 6.1 parts of 3-nitro benzyl chloride in 5 min for reaction for 4 h. Throughout the course of the reaction, use a dilute solution of sodium hydroxide to constantly adjust pH=9.0. After the completion of the reaction, add 40 parts of sodium chloride while stirring for salting; stir for 1 h and place for 2 h. Filter and dry the resulting product to obtain 11.8 parts of sodium salt mixture of compound Dm7, which is a red powder. The maximum absorption of the sodium salt mixture is 537 nm (in aqueous solutions). Mass spectrometry: m/z (3-): 274.6 ([M-3H]$^{-3}$), m/z (2-): 412.5 ([M-2H]$^{-2}$). The most abundant precise molecular mass (M) of the intermediate dye product Dm7 (as free sulfonic acid) is 827.1.

Dissolve the sodium salt of compound Dm7 in water, add acid to adjust the solution to be acidic, and then filter to obtain a filter cake. Dissolve the filter cake in water, and add potassium hydroxide, lithium hydroxide, ammonia, diethanolamine or triethanolamine to obtain potassium salt, lithium salt, ammonium salt, diethanolamine salt or triethanolamine salt of the compound respectively, in addition to the sodium salt.

Dm7

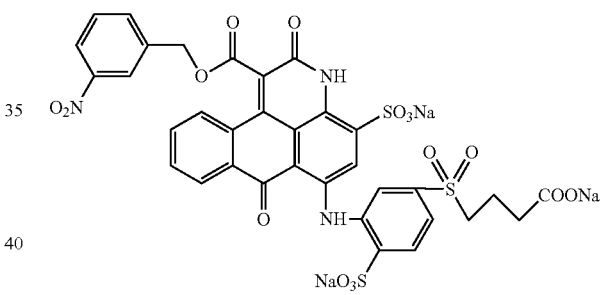

Embodiment 8

Take part of the aqueous solution of the compound Dm1 (containing 11.0 parts of Dp2) obtained in Embodiment 4, heat to 75° C. –80° C., adjust the pH to 9.0 and dropwise add 11.4 parts of 3-chlorobenzyl chloride in 0.5 h for reaction for 3 h; dropwise add 5.7 parts of 3-chlorobenzyl chloride in 5 min for reaction for 2 h; and then dropwise add 5.7 parts of 3-chlorobenzyl chloride in 5 min for reaction for 4 h. Throughout the course of the reaction, use a dilute solution of sodium hydroxide to constantly adjust pH=9.0. After the completion of the reaction, add 40 parts of sodium chloride while stirring for salting; stir for 1 h and place for 2 h. Filter and dry the resulting product to obtain 12.8 parts of sodium salt mixture of compound Dp10, which is a red powder. The maximum absorption of the sodium salt mixture is 538 nm (in aqueous solutions). Mass spectrometry: m/z (3-): 297.6 ([M-3H]$^{-3}$), m/z (2-): 447.2 ([M-2H]$^{-2}$). The most abundant precise molecular mass (M) of the dye product Dp10 (as free sulfonic acid) is 896.1.

Dissolve the sodium salt of compound Dp10 in water, add acid to adjust the solution to be acidic, and then filter to obtain a cake. Dissolve the filter cake in water, and add potassium hydroxide, lithium hydroxide, ammonia, diethanolamine or triethanolamine to obtain potassium salt, lithium salt, ammonium salt, diethanolamine salt or triethanolamine salt of the compound respectively, in addition to the sodium salt.

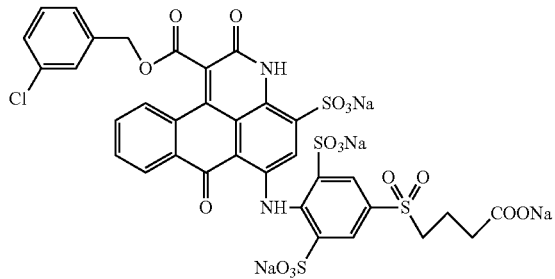

Dp10

Embodiment 9

Take part of the aqueous solution of the obtained compound Dp2 (containing 11.0 parts of Dm2), heat to 75° C. -80° C., adjust the pH to 9.0 and dropwise add 14.7 parts of 3-sulfonic acid group benzyl chloride in 0.5 h for reaction for 3 h; dropwise add 7.35 parts of 3-sulfonic acid group benzyl chloride chloride in 5 min for reaction for 2 h; and then dropwise add 7.35 parts of 3-sulfonic acid group benzyl chloride chloride for reaction for 4 h. Throughout the course of the reaction, use a dilute solution of sodium hydroxide to constantly adjust pH=9.0. After the completion of the reaction, add 40 parts of sodium chloride while stirring for salting; stir for 1 h and place for 2 h. Filter and dry the resulting product to obtain 13.4 parts of sodium salt mixture of compound Dp14, which is a red powder. The maximum absorption of the sodium salt mixture is 537 nm (in aqueous solutions). Mass spectrometry: m/z (3-): 313.1 ([$\underline{M}$-3H]$^{-3}$), m/z (2-): 470.2 ([$\underline{M}$-2H]$^{-2}$). The most abundant precise molecular mass ($\underline{M}$) of the intermediate dye product Dp14 (as free sulfonic acid) is 942.1.

Embodiment 10

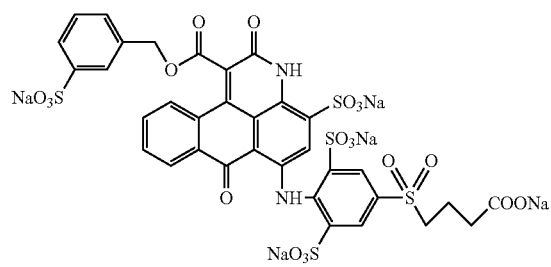

Dp14

Take part of the aqueous solution of the compound Dp2 obtained in Embodiment 4 (containing 9.0 parts of the dye Dp2), heat to 70° C. and dropwise add 6.6 parts of 1-chloromethyl naphthalene in 0.5 h for reaction for 1.5 h; Throughout the course of the reaction, use a dilute solution of sodium hydroxide to constantly adjust pH=5.2. After completion of the reaction, cool the reaction solution, adjust pH=9.0 with dilute sodium hydroxide solution, and then add 60 parts of methanol; stir for 2 h, a solid, i.e., (Dp17) compound, will be separate out. Filter the (Dp17) compound, wash in 100 parts of methanol, and then dry to obtain 10.4 parts of sodium salt of (Dp17) compound, which is a red powder. Mass Spectrometry: m/z (3-): 303.1 ([$\underline{M}$-3H]$^{-3}$), m/z (2-): 455.2 ([$\underline{M}$-2H]$^{-2}$) The most abundant precise molecular mass ($\underline{M}$) of the dye product Dp17 (as free sulfonic acid) is 912.1.

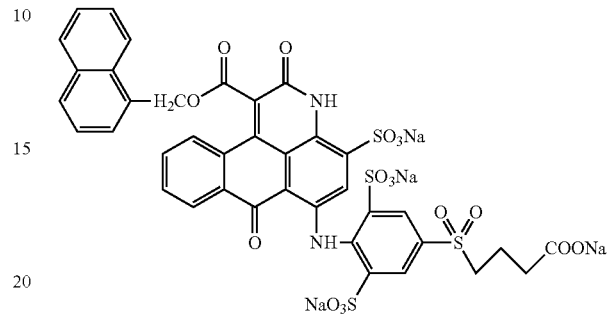

Dp17

Dissolve the sodium salt mixture of compound Dm17 in water, add acid to adjust the solution to be acidic, and then filter to obtain a cake. Dissolve the filter cake in water, and add potassium hydroxide, lithium hydroxide, ammonia, diethanolamine or triethanolamine to obtain potassium salt, lithium salt, ammonium salt, diethanolamine salt or triethanolamine salt of the compound respectively, in addition to the sodium salt.

Embodiment 11

(A) Preparation of Inks

Prepare the ink composition according to the formula described in Table 1 containing the products obtained in the above embodiment as the magenta colorant, and filter the ink composition with a 0.45 nm membrane filter to obtain the aqueous magenta ink composition of the present invention. Add triethanolamine to adjust the ink composition pH to 8~10 and add deionized water to make the total volume to reach 100 parts by weight.

By the same methods, prepare ink composition using anthrapyridone sulfonic dye Dye 1 with no carbonyl propyl sulfuryls and carboxyls (or carboxylic benzyl ester), commercial dye C.I. reactive red 180 (reactive red 180 for short) and C.I. direct red 227 for comparison dye.

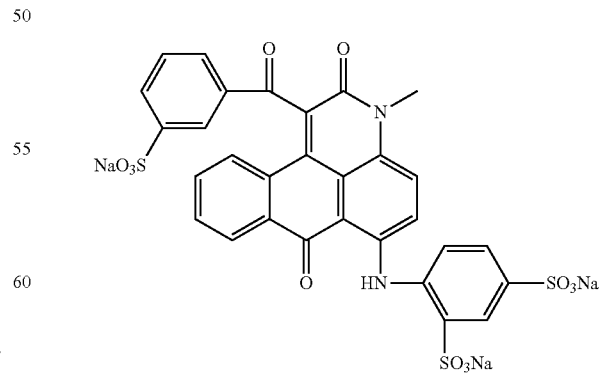

Dye 1

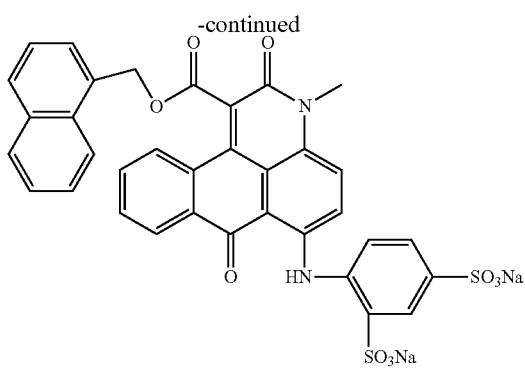

Dye 2

TABLE 1

Experimental composition of the ink

| Composition | Weight portion |
| --- | --- |
| Dyes | 6 |
| Diethylene glycol | 20 |
| Triethylene glycol | 16.25 |
| Glycerine | 17.5 |
| Surfactant AT5 | 2.5 |
| Triethanolamine | 0.2 |
| EDTA | 0.1 |
| Fungicide | 0.01 |
| Deionized water | To add the weight to 100 portions. |

(B) Ink-Jet Printer

Use an ink-jet printer (Epson 270 manufactured by Epson Company), glossy photo paper (Epson) and the above described ink compositions for ink-jet printing.

(C) Evaluation of Ink-Jet Printed Images (1) Light Resistance Test of Printed Images with Xenon Lamp Irradiate the printed glossy photo paper manufactured by Canon and Epson with Xenon-lamp Weathering Test Chamber ZG-P (manufactured by China Surui Company) at 60% RH and 24° C. with illuminance of 0.36 W/m² for 50 h, and check the color difference (ΔE) before and after the test. The color difference (ΔE) is calculated from the differences of values of L*, a*, b* before and after the test in the above described color measurement system (Unterlab) by the followings formula:

$$\Delta E = ((\text{difference of } L^*)^2 + (\text{difference of } a^*)^2 + (\text{difference of } b^*)^2)^{1/2}.$$

Three grades will be divided for the evaluation based on the following benchmark:

| ΔE < 10 | ○ |
| ΔE < 20 | Δ |
| ΔE > 20 | x |

(2) Gas Resistance of the Printed Images

Place the printed images in the Ozone Weathering Test Chamber (manufactured by China Surui Company) at 40 ppm ozone, 60% RH and 24° C. for 6 h. Calculate the color difference (ΔE) before and after the test in the same manner as described in (1) above and evaluate it in 3 grades based on the following benchmark:

| ΔE < 10 | ○ |
| ΔE < 20 | Δ |
| ΔE > 20 | x |

(3) Wet Resistance of the Printed Images

Place the printed images in the Constant Temperature and Humidity Chamber (manufactured by China Surui Company) at 50° C. and 90% RH for 168 h; judge the bleeding of the ink with bare eyes before and after the test and evaluate it in 3 grades based on the following benchmark:

| No bleeding | ○ |
| Slight bleeding | Δ |
| Notable bleeding | x |

(D) Evaluation of Water Solubility of the Dye (g/100 g Water)

| The solubility of the dye in water >30 | ○ |
| The solubility of the dye in water >15-20 | Δ |
| The solubility of the dye in water <15 | x |

(E) Evaluation of Long-Term Stability of the Dye in Aqueous Solvent Systems

Heat and dissolve the system consisting of 20 parts of dyes, 70 parts of water and 10 parts of ethylene glycol; after the solution cools down, store it airtight at a constant temperature of 50° C. for 7 d; cool it to 0° C. and store it at the same temperature for 7 d; filter the solution and evaluate it in 3 grades based on the following benchmark:

| No precipitation | ○ |
| Slight precipitation | Δ |
| Notable | x |

All the test results are listed in Table 2.

TABLE 2

Comparison of test results

| Dyes used | UV resistance of printed images | Ozone resistance of printed images | Water resistance of printed images | Water solubility of the dye | Long-term stability of the dye in aqueous solvent systems |
| --- | --- | --- | --- | --- | --- |
| Dm1 | ○ | ○ | ○ | ○ | ○ |
| Dm3 | ○ | ○ | ○ | ○ | ○ |
| Dm5 | ○ | ○ | ○ | ○ | ○ |
| Dm7 | ○ | ○ | ○ | ○ | ○ |
| Dp2 | ○ | ○ | ○ | ○ | ○ |
| Dp4 | ○ | ○ | ○ | ○ | ○ |
| Dp10 | ○ | ○ | ○ | ○ | ○ |
| Dp14 | ○ | ○ | Δ | ○ | ○ |
| Dp17 | ○ | ○ | ○ | Δ | ○ |
| Dye1 | ○ | ○ | ○ | Δ | Δ |
| Dye2 | ○ | ○ | ○ | Δ | Δ |
| 180 C.I. reactive red 180 | x | x | Δ | Δ | Δ |
| C.I. direct red 227 | x | x | Δ | x | Δ |

The comparison shows that anthrapyridone sulfonic dyes of the present invention, which contain carboxyl (or carboxylic benzyl ester), sulfonic acid groups and carbonyl propyl sulfuryl, feature extremely excellent solubility and long-term stability when used as dyes for inkjet inks, and images printed with the resulting inkjet ink compositions feature outstanding light resistance, ozone resistance and moisture resistance.

INDUSTRIAL APPLICABILITY

The anthrapyridone sulfonic acid compounds and salts thereof of general formula (1) of the present invention, which contain carboxyl (or carboxylic benzyl ester or naphthoate), sulfonic acid groups and carbonyl propyl sulfuryl, feature high solubility and stability in water and tone and brightness suitable for ink-jet printing. As magenta ink compositions containing these compounds have outstanding storage stability and images printed with the ink feature outstanding light resistance, moisture resistance and ozone resistance, these compounds are suitable magenta dyes for ink-jet printing.

What is claimed is:

1. A class of magenta dyes, include the compounds which simultaneously contain carboxyl group, sulfonic acid group and a carbonyl propyl sulfurylsulfonic acid group on an anthrapyridone skeleton, showing in the form of general formula (I) or their mixtures:

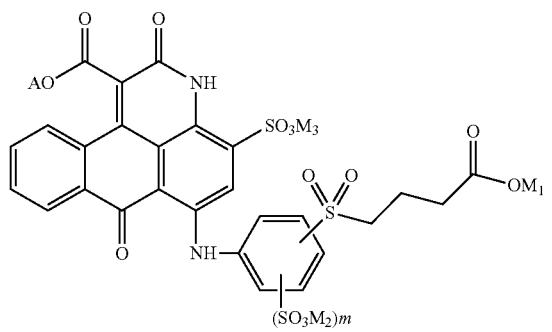

I wherein in the general formula (I): A is a cation $M_4$, a substituted or unsubstituted benzyl group, or a substituted or unsubstituted naphthyl methyl; $M_1$, $M_2$, $M_3$ are respectively cation or cationic groups; sulfonic acid group $(SO_3M_2)_m$ may be located any position of the benzene ring, and m is an integer of 0-2.

2. The magenta dyes according to claim 1, wherein, when A is cation $M_4$, the general formula (I) is changed to the general formula (I'):

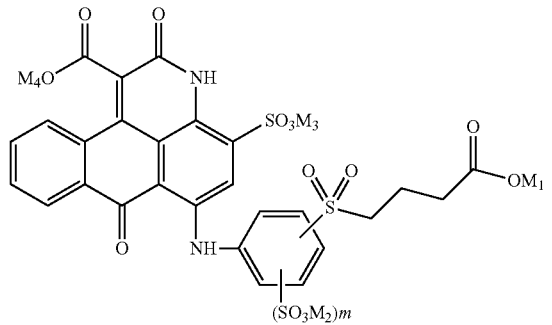

I' when A is substituted or unsubstituted benzyl group, the general formula (I) is changed to the general formula (II):

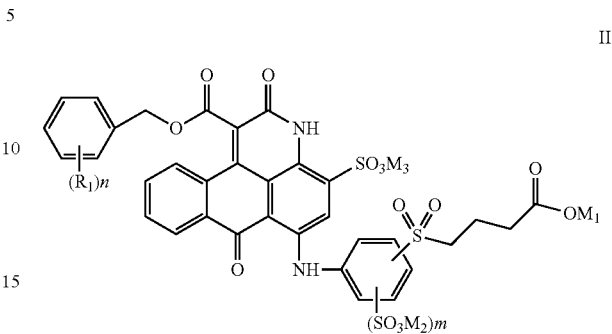

II when A is substituted or unsubstituted naphthyl methyl, the general formula (I) is changed to the general formula (II'):

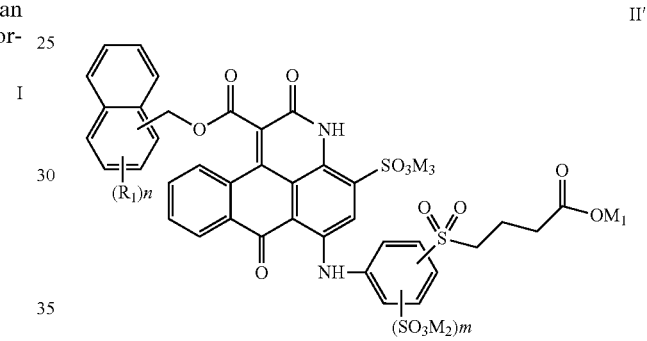

II' wherein in the general formula (II) and (II'), $R_1$ is H, $C_{1-6}$alkyl group, CN, $NO_2$, $SO_3H$ or $SO_3M_5$, F, Cl, Br, $CO_2H$, $CO_2M_6$, $CO_2R_2$, or $NHCOR_3$; $R_2$ is H or $C_{1-6}$alkyl group; $R_3$ is H or $C_{1-6}$alkyl group; $(R_1)n$ may be located any position of the benzene ring, and n is an integer of 0-3;

in the general formula (I'), (II) and (II'), $M_1$, $M_2$, $M_3$, $M_4$, $M_5$, $M_6$ are respectively cation or cationic groups; sulfonic acid group $(SO_3M_2)_m$ may be located any position of the benzene ring, and m is an integer of 0-2.

3. The magenta dyes according to claim 2, wherein $M_1$, $M_2$, $M_3$, $M_4$, $M_5$, $M_6$ are selected from the group consisting of the following cation: $H^+$, $Li^+$, $Na^+$, $K^+$, $NH_4^+$ and organic ammonium salts $N^+R_4R_5R_6R_7$, of which $R_4$, $R_5$, $R_6$, $R_7$ are respectively the same or different H, $C_{1-18}$ alkyl group, cyclohexyl group, $CH_2CH_2OH$, $CH(CH_3)CH_2OH$ or benzyl group.

4. The magenta dyes according to claim 2, wherein m is an integer of 1-2.

5. The magenta dyes according to claim 3, wherein the organic ammonium salt $N^+R_4R_5R_6R_7$ is selected from the group consisting of:
monoethanolamine salt, diethanolamine salt, triethanolamine salt, monoisopropanolamine salt, diisopropanolamine salt and triisopropanolamine salt.

6. The magenta dyes according to claim 3, wherein the cation is selected from the group consisting of $H^+$, $Li^+$, $Na^+$, $K^+$, and $NH_4^+$.

7. The magenta dyes according to claim 1, wherein the compound shown in the general formula (I) may be utilized in the form of mixture with any weight ratio.

8. The magenta dyes according to claim 3, wherein the compound shown in the general formula (I) may be utilized in the form of mixture with any weight ratio.

9. A method for preparing the compounds shown in the general formula (I) or their mixtures according to claim 1, comprising the following steps:

(1) synthesizing an intermediate compound shown in the general formula (IV):

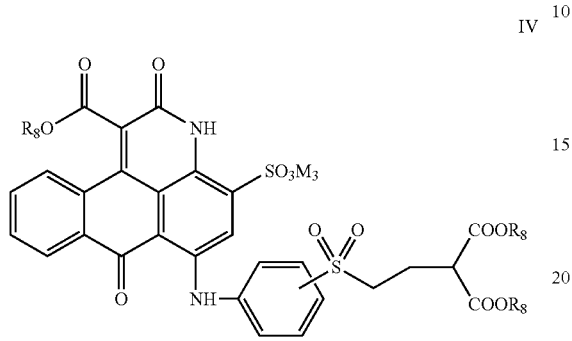

IV wherein in the general formula (IV), $R_8$ is $C_1$-$C_4$ alkyl group;

cyclization steps comprise: based on a compound shown in general formula (III) or (III') as a raw material, carrying out cyclization reaction on compound shown in the general formula (III) or (III') and malonic acid diester ($R_8OOC$—C—$COOR_8$) in an organic solvent at the temperature of 100° C.-250° C. for 2-10 h to form the intermediate compound shown in the general formula (IV);

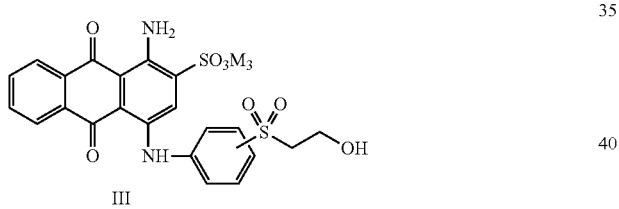

III or

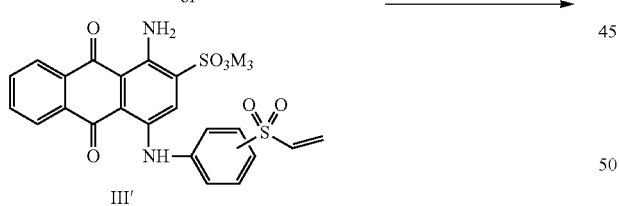

III'

$R_8OOC\diagup COOR_8$ →

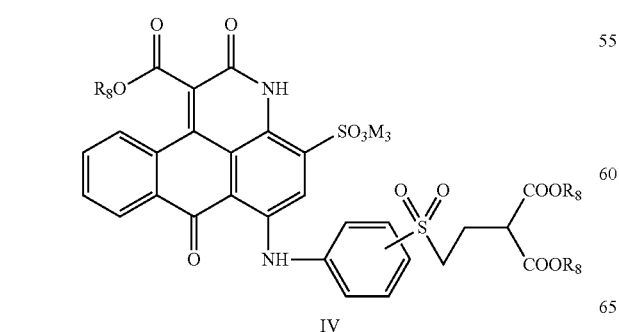

IV cool the reaction system after the cyclization and filter the compound of general formula (IV) separated out from the liquid reaction system to obtain solid intermediate (IV) compounds;

(2) sulfonation and decomposition step: the intermediate compound shown in the general formula (IV) is sulfonated with fuming sulfuric acid ($SO_3.H_2SO_4$) containing 5-30% $SO_3$ or chlorosulfonic acid under the temperature of 10° C-120° C., and simultaneously decomposition reaction is carried out for 2-4 h to obtain a sulfonation liquid; said sulfonation liquid comprises one or more sulfonation compounds shown in general formulas (V), (VI),(VII);

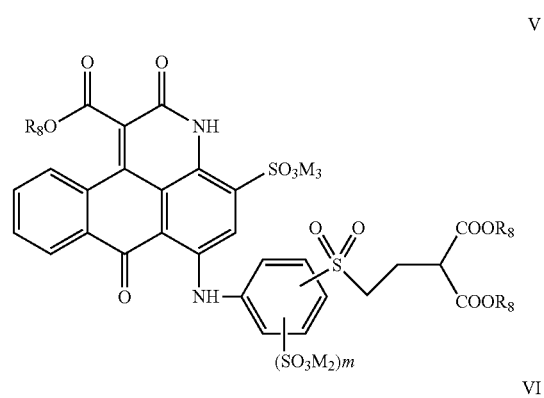

V

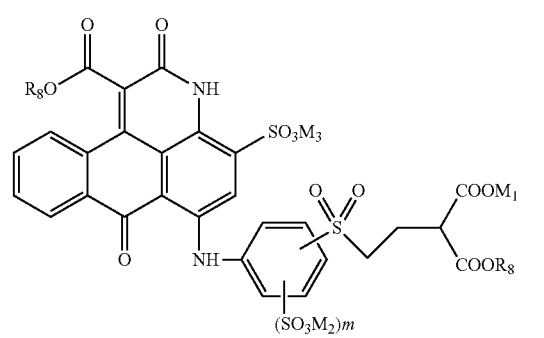

VI

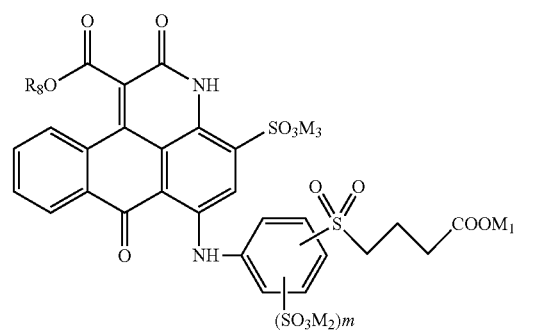

VII (3) hydrolysis step: the sulfonation compounds obtained in the step (2) are hydrolyzed at acid condition or alkaline condition;

hydrolysis at acid condition: heated the sulfonation liquid obtained in the step (2) to 40° C-80° C., and hydrolysis 1.5-5 h; then neutralizing the sulfuric acid in the sulfonation liquid utilizing alkali, finally obtained solution of a compound shown in general formula (I'),

I'

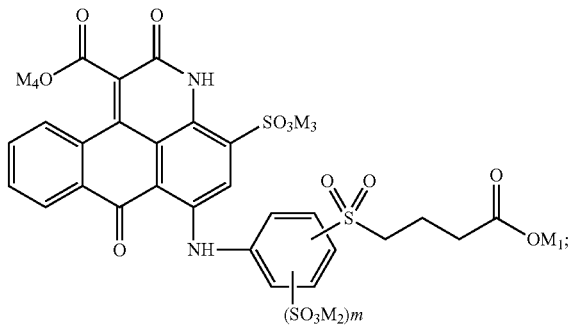

hydrolysis at alkaline condition: neutralized the sulfonation liquid obtained in the step (2) utilizing alkali to neutral, then adjusted pH utilizing alkali to 9-10 emerging alkalescence, then heated to 40° C-80° C., hydrolyzed 1.5-5 h, finally obtained solution of the compound shown in the general formula (I');

(4) benzylation step: solution of compound shown in general formula (II) is obtained by benzylation reaction utilizing benzylation reagent and solution of the compound shown in the general formula (I') in the step (3), temperature of the benzylation reaction is 50° C-150° C., pH of the benzylation reaction is 0-12, mole rate of the compound shown in the general formula (I'):benzylation reagent of the benzylation reaction is 1:1-100, reaction time of the benzylation reaction is 1-120 h

II

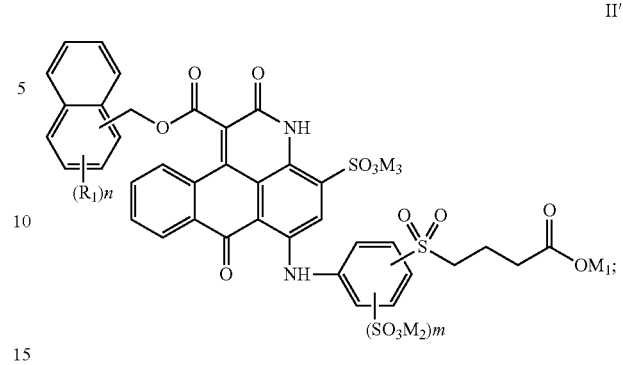

or naphthyl methylation step: solution of compound shown in general formula (II') is obtained by naphthyl methylation reaction utilizing naphthyl methylation reagent and solution of the compound shown in the general formula (I') in the step (3), temperature of the naphthyl methylation reaction is 70° C-150° C., pH of the naphthyl methylation reaction is 0-12, mole rate of the compound shown in the general formula (I'): naphthyl methylation reagent of the benzylation methylation reaction is 1:1-20, reaction time of the naphthyl methylation reaction is 0.5-10 h,

II'

(5) salting-out step: the solution of compound shown in general formula (II) or the solution of compound shown in general formula (II') obtained in the step (4) is salted out with a salt to generate a salt mixture, wherein the salt mixture comprises one or more salts of the compounds shown in the general formula (I);

(6) separation step: the salts of the compounds shown in the general formula (I) are separated out from the salt mixture by adopting stepwise salting out, reversed phase ion-pair chromatography, and the obtained salts of the compounds are respectively desalinated to generate the compounds shown in the general formula (I).

10. A method for preparing the compounds shown in the general formula (I) or their mixtures according to claim 9, wherein,
in the step (1), said reaction temperature is 100° C-200° C., said reaction time is 2-12 h, said organic solvent has boiling point of 100° C-300° C. and can dissolve or partially dissolve reaction raw material shown in the general formula (III) or (III');
in the step (2), said reaction time is 3-4 h, said sulfonation temperature is 10° C-100° C., and the content of sulfur trioxide in fuming sulfuric acid is 5-20%;
in the step (3), said hydrolysis temperature is 40° C-80° C., hydrolysis time is 1.5-5 h; the alkali utilizing in the hydrolysis reaction is selected from the group consisting of: sodium hydroxide, calcium hydroxide, potassium hydroxide, ferric hydroxide, and copper hydroxide;
in the step (5), said salt utilized in the salting-out step is an inorganic salt, and the inorganic salt is selected from the group consisting of ammonium chloride, sodium chloride and lithium chloride.

11. A method for preparing the compounds shown in the general formula (I) or their mixtures according to claim 9, wherein, the number m of sulfonic group of compounds in the step (2) is relation to the amount of sulfur trioxide in fuming sulfuric acid and the sulfonation temperature; When at the low content and low temperature, obtaining the compound with m is 1; When at the higher content and temperature, obtaining the compound with m is 2.

12. A method for preparing the compounds shown in the general formula (I) or their mixtures according to claim 10, wherein,
in the step (1), said reaction temperature is 130° C-190° C., said reaction time is 2-10 h, said organic solvent has the boiling point of 140° C-250° C.;
in the step (2), said content of sulfur trioxide in fuming sulfuric acid is 6-15%;
in the step (3), said hydrolysis temperature is 40° C-70° C., hydrolysis time is 1.5-4 h;

in the step (4), said temperature of benzylation reaction is 60° C-130° C., said pH of benzylation reaction is 3-12, said mole rate of the compound shown in the general formula (I'):benzylation reagent of the benzylation reaction is 1:1-80, said reaction time of benzylation reaction is 1-96 h, said temperature of naphthyl methylation reaction is 70° C-130° C., said pH of naphthyl methylation reaction is 3-12, said mole rate of the compound shown in the general formula (I'): naphthyl methylation reagent of the benzylation methylation reaction is 1:1-10, said reaction time of naphthyl methylation reaction is 1-5 h.

13. A method for preparing the compounds shown in the general formula (I) or their mixtures according to claim 12, wherein,
    in the step (1), said reaction time is 2-8h ,said organic solvent has the boiling point of 140° C-200° C.;
    in the step (3), said hydrolysis temperature is 50° C-70° C., hydrolysis time is 1.5-3 h;
    in the step (4), said temperature of benzylation reaction is 70° C-80° C., said pH of benzylation reaction is 5-10, said mole rate of the compound shown in the general formula (I'):benzylation reagent of the benzylation reaction is 1:1-70, said reaction time of benzylation reaction is 1-72 h, said temperature of naphthyl methylation reaction is 70° C-120° C., said pH of naphthyl methylation reaction is 4-9, said mole rate of the compound shown in the general formula (I'): naphthyl methylation reagent of the benzylation methylation reaction is 1:1-5, said reaction time of naphthyl methylation reaction is 1-3 h.

14. A method for preparing the compounds shown in the general formula (I) or their mixtures according to claim 13, wherein,
    in the step (4), said pH of benzylation reaction is 6-10, said mole rate of the compound shown in the general formula (I'):benzylation reagent of the benzylation reaction is 1:1-60, said reaction time of benzylation reaction is 1-48 h, said temperature of naphthyl methylation reaction is 50° C-110° C., said pH of naphthyl methylation reaction is 5-7, said mole rate of the compound shown in the general formula (I'): naphthyl methylation reagent of the benzylation methylation reaction is 1:1-3.

15. A method for preparing the compounds shown in the general formula (I) or their mixtures according to claim 14, wherein,
    in the step (4), said pH of benzylation reaction is 7-9, said mole rate of the compound shown in the general formula (I'):benzylation reagent of the benzylation reaction is 1:1-50, said reaction time of benzylation reaction is 1-24 h, said temperature of naphthyl methylation reaction is 50° C-100° C.

16. A method for preparing the compounds shown in the general formula (I) or their mixtures according to claim 15, wherein, in the step (4) said mole rate of the compound shown in the general formula (I'):benzylation reagent of the benzylation reaction is 1:1-40.

17. An ink-jet water-based ink composition, comprising 1-20 wt % of the magenta dyes according to claim 1, 5-50 wt % of organic solvent miscible with water and 30-94 wt % of water, based on the total weight of the composition.

18. An ink-jet water-based ink composition according to claim 17, wherein the sum of the component contents is 100%.

19. An ink-jet water-based ink composition according to claim 17, wherein said water-miscible organic solvents are selected from the group consisting of: ethanol, n-propanol, Isopropanol, ethylene glycol, diethylene glycol, triethylene glycol, glycerol, ethylene glycol monobutyl ether, diethylene glycolmonobutyl ether, triethylene glycol monobutyl ether, propylene glycol,butanediol, pentanediol,hexanediol,diglycerol,2-pyrrolidone and N-methyl-2-pyrrolidone.

20. An application of the magenta dyes according to claim 1, serving as a colorant for the following materials: ink, coating, paint, laser printing toner, marker, paper, fabric, glass, or ceramic.

* * * * *